United States Patent
Lokhande

(10) Patent No.: US 10,116,878 B2
(45) Date of Patent: Oct. 30, 2018

(54) METHOD FOR PRODUCING MEDIA FILE AND ELECTRONIC DEVICE THEREOF

(71) Applicant: SAMSUNG ELECTRONICS CO., LTD., Suwon-si (KR)

(72) Inventor: Vishal Lokhande, Athner (IN)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 0 days.

(21) Appl. No.: 15/630,227

(22) Filed: Jun. 22, 2017

(65) Prior Publication Data

US 2018/0176481 A1 Jun. 21, 2018

(30) Foreign Application Priority Data

Dec. 21, 2016 (IN) .............................. 201641043745

(51) Int. Cl.
| | |
|---|---|
| H04N 5/93 | (2006.01) |
| H04N 5/262 | (2006.01) |
| G11B 27/036 | (2006.01) |
| G11B 20/10 | (2006.01) |

(52) U.S. Cl.
CPC ..... *H04N 5/2621* (2013.01); *G11B 20/10527* (2013.01); *G11B 27/036* (2013.01); *H04N 5/9305* (2013.01); *G11B 2020/10537* (2013.01)

(58) Field of Classification Search
CPC .. H04N 5/2621; H04N 5/9305; G11B 27/036; G11B 20/10527; G11B 2020/10537
USPC ................................. 386/278, 280, 281, 286
See application file for complete search history.

(56) References Cited

U.S. PATENT DOCUMENTS

| | | | |
|---|---|---|---|
| 6,292,219 | B1 | 9/2001 | Fredlund et al. |
| 7,565,058 | B2 | 7/2009 | Kihara et al. |
| 8,203,626 | B2 | 6/2012 | Ota |
| 8,896,726 | B2 | 11/2014 | Kunishige et al. |
| 2010/0004033 | A1* | 1/2010 | Choe ................... G06F 1/1626 455/567 |
| 2012/0206653 | A1* | 8/2012 | Graves ................ G11B 27/031 348/571 |
| 2018/0122197 | A1* | 5/2018 | Wu ..................... G06K 9/00711 |

* cited by examiner

*Primary Examiner* — Robert Chevalier
(74) *Attorney, Agent, or Firm* — Sughrue Mion, PLLC

(57) ABSTRACT

A method for producing a media file in an electronic device is provided. The method includes detecting an event during recording of media frames, determining at least one effect to be applied on the media frames, applying the determined effect on at least one of at least one first media frame from a first set of media frames and at least one second media frame from a second set of media frames, and generating a media file comprising the first and second sets of the media frames.

20 Claims, 36 Drawing Sheets

METHOD FOR PRODUCING MEDIA FILE AND ELECTRONIC DEVICE THEREOF

CROSS-REFERENCE TO RELATED APPLICATION(S)

This application claims the priority under 35 U.S.C. § 119(a) of an Indian patent application filed on Dec. 21, 2016 in the Indian Patent Office and assigned Serial number 201641043745, the entire disclosure of which is hereby incorporated by reference.

TECHNICAL FIELD

The present disclosure relates to media recording in electronic devices. More particularly, the present disclosure relates to a method and an electronic device for producing a media file.

BACKGROUND

In general, a recording apparatus (an electronic device such as camera, mobile phone, etc.,) that records media frames (e.g., video frames, images, panorama, etc.,) from an imaging component are well known in the art. Currently, one of the most widely used application in a multimedia field satisfying user preferences is, for example, recording the media frames by the recording apparatus and utilizing an external editing apparatus/mechanism for applying special effects on the media frame(s) outputted by the recording apparatus.

The special effects may include, for e.g., changing the resolution of the media frame captured to enhance/customize the media content as per the user preferences, deleting the media frame, changing the media frame, etc., provided by the external editing apparatus/mechanism. These special effects may be applied to the recorded media frame after the recording is completed and the recorded media frame is stored in a file.

Still, the area within which editing of the media frames at different interval during the runtime/recording the media content remain unexplored.

The above information is presented as background information only to assist with an understanding of the present disclosure. No determination has been made, and no assertion is made, as to whether any of the above might be applicable as prior art with regard to the present disclosure.

SUMMARY

The principal object of the embodiments herein is to provide a method and electronic device for producing a media file.

Another object of the embodiments herein is to provide a method for detecting, by a recording unit, an event in the electronic device while recording media frames on a storage medium.

Another object of the embodiments herein is to provide a method for displaying, by the recording unit, a plurality of effects on a screen of the electronic device.

Another object of the embodiments herein is to provide a method for detecting, by the recording unit, an effect selected from the plurality of effects displayed on the screen of the electronic device.

Another object of the embodiments herein is to provide a method for applying, by the recording unit, the selected effect on at least one of at least one past media frame from a set of past media frames already recorded by the recording unit and at least one future media frame from a set of future media frames to be recorded by the recording unit.

Another object of the embodiments herein is to provide a method for producing, by the recording unit, a media file comprising sets of the past and future media frames.

Another object of the embodiments herein is to provide a temporary storage medium configured to store the set of past media frames and the set of future media frames in a temporary buffer, wherein the selected effect is applied on the at least one past media frame and the at least one future media frame in the temporary buffer before storing into a permanent storage medium.

Yet another object of the embodiments herein is to provide a method for recording, by a first recording unit, a first set of media frames.

Yet another object of the embodiments herein is to provide a method for detecting, by a processor, an event.

Yet another object of the embodiments herein is to provide a method for switching, by the processor, the first recording unit into a second recording unit in response to detecting the event, wherein the second recording unit is configured to record a second set of media frames.

Yet another object of the embodiments herein is to provide a method for producing, by the processor, the media file comprising the first set of media frames and the second set of media frames.

Again yet another object of the embodiments herein is to provide a method for detecting, by a recording unit, an event in the electronic device while recording a first set of media frames in a first media format on a storage medium.

Again yet another object of the embodiments herein is to provide a method for displaying, by the recording unit, a plurality of media formats on a screen of the electronic device.

Again yet another object of the embodiments herein is to provide a method for detecting, by the recording unit, a second media format selected from the plurality media formats displayed on the screen of the electronic device.

Again yet another object of the embodiments herein is to provide a method for applying, by the recording unit, the second media format on at least one media frame from a set of second media frames to be recorded by the recording unit.

Again yet another object of the embodiments herein is to provide a method for producing, by the recording unit, the media file comprising the first set of media frames in the first media format and the second set of media frames in the second media format.

Another object of the embodiments herein is to provide a method by which the user can control recording of the multimedia contents (i.e., media frames) with varying/distinct effect/resolution/format/quality which can only be selected before starting the recording of multimedia content.

Another object of the embodiments herein is to provide a method by which the user can change in Video-Effect/Audio-effect/Audio-Quality (Bitrate)/Video-Quality (Resolution)/Video-format/Audio-Format, automatically or when recording of video/audio model is paused by user recording the content.

Aspects of the present disclosure are to address at least the above-mentioned problems and/or disadvantages and to provide at least the advantages described below. Accordingly, an aspect of the present disclosure is to provide a method for producing a media file and an electronic device therefor.

In accordance with an aspect of the present disclosure, a method for producing a media file in an electronic device is provided. The method includes the operations of detecting an event during recording of media frames, determining at least one effect to be applied on the media frames, applying the determined effect on at least one of at least one first media frame from a first set of media frames and at least one second media frame from a second set of media frames, and generating a media file comprising the first and second sets of the media frames.

In accordance with another aspect of the present disclosure, an electronic device for producing a media file is provided. The electronic device includes at least one recording unit configured to detect an event during recording of media frames, determine at least one effect to be applied on the media frames, apply the determined effect on at least one of at least one first media frame from a first set of media frames and at least one second media frame from a second set of media frames, and generate a media file comprising the first and second sets of the media frames.

In accordance with another aspect of the present disclosure, a non-transitory computer-readable medium comprises computer executable instructions that when executed by a processor of an electronic device cause the processor to effectuate is provided. The method includes the operations of detecting an event during recording of media frames, determining at least one effect to be applied on the media frames, applying the determined effect on at least one of at least one first media frame from a first set of media frames and at least one second media frame from a second set of media frames, and generating a media file comprising the first and second sets of the media frames.

Other aspects, advantages, and salient features of the disclosure will become apparent to those skilled in the art from the following detailed description, which, taken in conjunction with the annexed drawings, discloses various embodiments of the present disclosure.

Accordingly the embodiments herein provide a method for producing a media file by an electronic device. The method includes detecting an event in the electronic device while recording media frames on a storage medium, displaying a plurality of effects on a screen of the electronic device, detecting an effect selected from the plurality of effects displayed on the screen of the electronic device, applying the selected effect on at least one of at least one past media frame from a set of past media frames already recorded by the recording unit and at least one future media frame from a set of future media frames to be recorded by the recording unit, and producing the media file comprising the sets of the past and future media frames.

In an embodiment, the storage medium is a temporary storage medium configured to store the set of past media frames and the set of future media frames in a temporary buffer, wherein the selected effect is applied on the at least one past media frame and the at least one future media frame in the temporary buffer before storing into a permanent storage medium.

In an embodiment, the event is at least one of a battery event, a pause event, a memory space event, a light event, a color event, a face detection event, and a system generated event.

In an embodiment, the effect is at least one of an animation effect, an effect to change visual parameters of at least one media frame, an effect to skip at least one media frame, an effect to secure at least one media frame, an effect to mask at least one region of interest (ROI) in at least one media frame, an effect to change a media format of at least one media frame, and an effect to switch among recording units of the electronic device.

In an embodiment, applying the selected effect on at least one of the at least one past media frame from the set of past media frames already recorded by the recording unit and the at least one future media frame from the set of future media frames to be recorded by the recording unit includes: determining the at least one past media frame from the set of past media frames on which the selected effect has to be applied, wherein the selected effect is an effect to skip at least one media frame, skipping the at least one past media frame, and recording the set of future media frames and optionally skipping the at least one future media frame in the set of future media frames.

In an embodiment, applying the selected effect on at least one of the at least one past media frame from the set of past media frames already recorded by the recording unit and the at least one future media frame from the set of future media frames to be recorded by the recording unit includes: determining the at least one past media frame from the set of past media frames on which the selected effect has to be applied, wherein the selected effect is an animation effect, changing animation of the at least one past media frame and changing the animation of at least one future media frame from the set of future media frames.

In an embodiment, applying the selected effect on at least one of the at least one past media frame from the set of past media frames already recorded by the recording unit and the at least one future media frame from the set of future media frames to be recorded by the recording unit includes: determining the at least one past media frame from the set of past media frames on which the selected effect has to be applied, wherein the selected effect is an effect to change visual parameters, changing the visual parameters of the at least one past media frame, and changing the visual parameters of at least one future media frame from the set of future media frames.

In an embodiment, applying the selected effect on at least one of the at least one past media frame from the set of past media frames already recorded by the recording unit and the at least one future media frame from the set of future media frames to be recorded by the recording unit includes: determining at least one media frame from the set of past media frames on which the selected effect to be applied, wherein the selected effect is an effect to make at least one media frame secure, securing the at least one past media frame from the set of past media frames, and securing the at least one future media frame from the set of future media frames.

In an embodiment, applying the selected effect on at least one of the at least one past media frame from the set of past media frames already recorded by the recording unit and the at least one future media frame from the set of future media frames to be recorded by the recording unit includes: determining at least one media frame from the set of past media frames on which the selected effect to be applied, wherein the selected effect is an effect to mask at least one ROI from at least one media frame, determining the portion of the at least one past media frame in which the ROI is available, masking the at least one portion in the at least one past media in which the ROI is available, and masking at least one portion in the at least one future media frame in which the ROI is available.

Accordingly the embodiments herein provide a method for producing a media file by an electronic device. The method includes recording a first set of media frames, detecting an event, switching into a second recording unit in response to detecting the event, wherein the second recording unit is configured to record a second set of media frames, and producing the media file comprising the first set of media frames and the second set of media frames.

In an embodiment, the event comprises at least one of battery event, pause event, a memory space event, a light event and a system generated event.

In an embodiment, the first set of media frames are recorded in a first media format and the second set of media frames are recorded in a second media format.

In an embodiment, the first recording unit is a rear camera and the second recording unit is a front camera.

Accordingly the embodiments herein provide a method for producing a media file by an electronic device. The method includes detecting an event in the electronic device while recording a first set of media frames in a first media format on a storage medium, displaying a plurality of media formats on a screen of the electronic device, detecting a second media format selected from the plurality media formats displayed on the screen of the electronic device, applying the second media format on at least one media frame from a set of second media frames to be recorded by the recording unit, and producing, by the recording unit, the media file comprising the first set of media frames in the first media format and the second set of media frames in the second media format.

Accordingly the embodiments herein provide an electronic device for producing a media file. The electronic device includes a recording unit configured to: detect an event in the electronic device while recording media frames on a storage medium, display a plurality of effects on a screen of the electronic device, detect an effect selected from the plurality of effects displayed on the screen of the electronic device, apply the selected effect on at least one of at least one past media frame from a set of past media frames already recorded by the recording unit and at least one future media frame from a set of future media frames to be recorded by the recording unit, and produce the media file comprising the sets of the past and future media frames.

Accordingly the embodiments herein provide an electronic device for producing a media file. The electronic device includes a first recording unit configured to record a first set of media frames, a processor configured to detect an event, switch the first recording unit into a second recording unit in response to detecting the event, wherein the second recording unit configured to record a second set of media frames, and produce the media file comprising the first set of media frames and the second set of media frames.

Accordingly the embodiments herein provide an electronic device for producing a media file. The electronic device includes a recording unit configured to: detect an event in the electronic device while recording a first set of media frames in a first media format on a storage medium, display a plurality of media formats on a screen of the electronic device, detect a second media format selected from the plurality media formats displayed on the screen of the electronic device, apply the second media format on at least one media frame from a set of second media frames to be recorded by the recording unit, and produce the media file comprising the first set of media frames in the first media format and the second set of media frames in the second media format.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The above and other aspects, features, and advantages of various embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
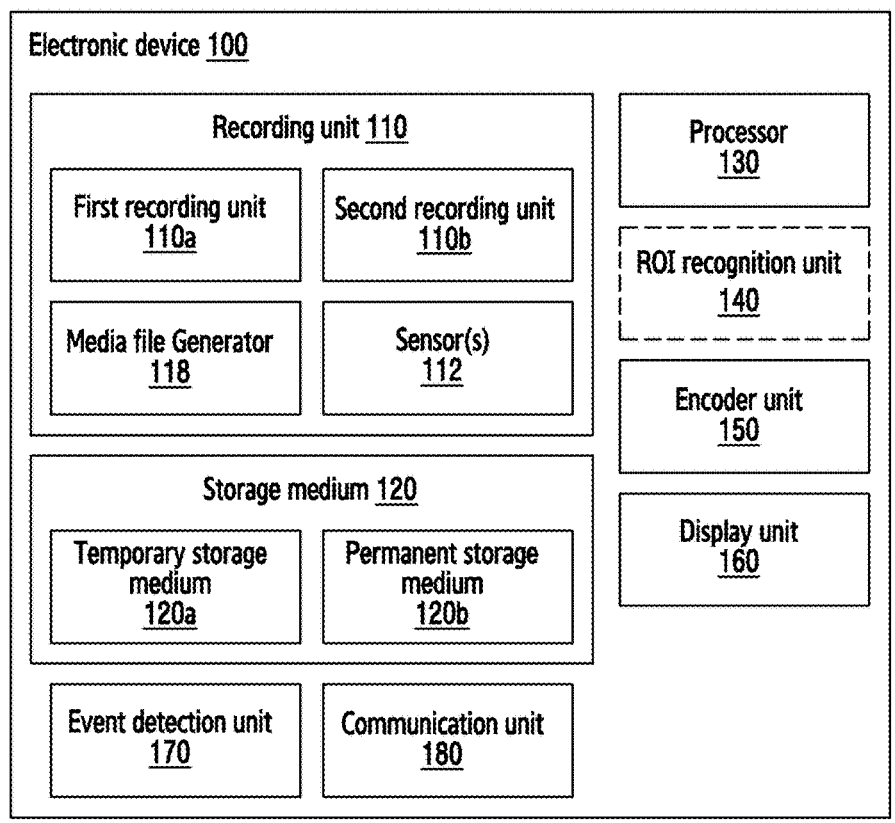
FIG. 1 is a schematic diagram of an electronic device for producing a media file according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Various embodiments may be described and illustrated in terms of blocks which carry out a described function or functions. These blocks, which may be referred to herein as units or modules or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware and/or software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into one or more complex blocks without departing from the scope of the disclosure.

Various embodiments of the present disclosure may be implemented on, or in conjunction with, existing controllers in control systems of computers or electronic devices which are well-known in the art. All the ensuing disclosures and accompanying illustrations of the preferred various embodiments of the present disclosure are merely representative for the purpose of sufficiently describing the manner by which the present disclosure may be carried out into practice in various ways other than the ones outlined and/or exemplified in the ensuing description.

It is to be understood and appreciated by a person skilled in the art or having ordinary skills in the art, however, that the implementations used to describe how to make and use the present disclosure may be embodied in many alternative forms and should not be construed as limiting the scope of the appended claims in any manner, absent express recitation of those features in the appended claims. All the diagrams and illustrations accompanying the ensuing description should also not be construed as limiting the scope of the appended claims in any manner.

It is also to be understood and appreciated that the use of ordinal terms like "first" and "second" is used herein to distinguish one element, feature, component, calculation or process operation to another and should not also be construed as limiting the scope of the appended claims, and that these and such other ordinal terms that may appear in the ensuing description are not indicative of any particular order of elements, features, calculations, components or process operations to which they are attached. For example, a first element could be termed a second element. Similarly, a second element could be termed a first element. All these do not depart from the scope of the herein disclosure and its accompanying claims.

Unless the context clearly and explicitly indicates otherwise, it is to be understood that like reference numerals refer to like elements throughout the ensuing description of the figures and/or drawings, that the linking term "and/or"

includes any and all combinations of one or more of the associated listed items, and that some varying terms of the same meaning and objective may be interchangeably used.

Unless defined differently, all terms used in the present disclosure, including technical or scientific terms, have meanings that are understood generally by a person having ordinary skill in the art. Ordinary terms that may be defined in a dictionary should be understood to have the meaning consistent with their context, and unless clearly defined in the present disclosure, should not be interpreted to be excessively idealistic or formalistic.

According to various embodiments of the present disclosure, the terminology media frame may include for example, one or more content related to any image (also, a panorama image) already recorded/to be recorded/currently recording, one or more content related to any video already recorded/to be recorded/currently recording, one or more content related to any audio already recorded/to be recorded/currently recording, etc.

Accordingly the embodiments herein provide a method and electronic device for producing a media file. The method includes detecting an event in the electronic device while recording media frames on a storage medium, displaying a plurality of effects on a screen of the electronic device, detecting an effect selected from the plurality of effects displayed on the screen of the electronic device, applying the selected effect on at least one of at least one past media frame from a set of past media frames already recorded by the recording unit and at least one future media frame from a set of future media frames to be recorded by the recording unit, and producing the media file comprising the sets of the past and future media frames.

Accordingly the embodiments of the present disclosure provide a method and electronic device for producing a media file. The method includes recording a first set of media frames, detecting an event, switching the first recording unit into a second recording unit in response to detecting the event, wherein the second recording unit is configured to record a second set of media frames, and producing the media file comprising the first set of media frames and the second set of media frames.

Accordingly the embodiments of the present disclosure provide a method and electronic device for producing a media file. The method includes detecting an event in the electronic device while recording a first set of media frames in a first media format on a storage medium, displaying a plurality of media formats on a screen of the electronic device, detecting a second media format selected from the plurality media formats displayed on the screen of the electronic device, applying the second media format on at least one media frame from a set of second media frames to be recorded by the recording unit, and producing, by the recording unit, the media file comprising the first set of media frames in the first media format and the second set of media frames in the second media format.

Unlike conventional methods and system, where there is no provision of changing the resolution of the media frame while/during the media recording (i.e., runtime), the proposed method and system may therefore allow a user to leverage a multimedia field by adding one or more effect on the media frame during the media recording (i.e., runtime/while the media recording is ongoing). The effect such as changing the resolution of the media frame.

Unlike conventional methods and systems, where there is no provision of changing the format of the media frame while the media is recorded (i.e., runtime), the proposed method and system may therefore allow a user to leverage a multimedia field by adding one or more effect on the media frame during the media recording (i.e., runtime/while the media recording is ongoing). The effect such as changing the format of the media frame, skip few frames, etc.

FIG. 1 is a schematic diagram of an electronic device for producing a media file according to an embodiment of the present disclosure. The electronic device 100 can be, for example, a laptop, a desktop computer, a mobile phone, a smart phone, personal digital assistants (PDAs), a tablet, a phablet, a consumer electronic device, a dual display device, digital camera, camera of the electronic device, video recorder, cam recorder, or any other electronic device. In another embodiment, the electronic device 100 can be a wearable device capable of recording the media (e.g., audio, video, panorama image, image, etc.). The wearable device can be, for example, a smart watch, a smart bracelet, a smart glass, etc.

The electronic device 100 may include (or, be associated with) a display unit 160 (e.g., a cathode ray tube (CRT), a liquid crystal display (LCD)), a light-emitting diode (LED) being interfaced with the processor 130 (for example; a hardware unit, an apparatus, a central processing unit (CPU), a graphics processing unit (GPU)) and a recording unit 110; a storage medium 120, a region of interest (ROI) recognition unit 140, an encoder unit 150, an event detection unit 170, and a communication unit 180.

According to various embodiments of the present disclosure, an electronic device may be any combination of the foregoing devices. In addition, it will be apparent to one having ordinary skill in the art that an electronic device according to various embodiments of the present disclosure is not limited to the foregoing devices.

The recording unit 110 can be for example a video recording unit, an audio recording unit, an image recording unit, the image such as for example, panorama image, any other image, etc. The recording unit 110 can be configured to detect an event in the electronic device 100 while recording media frames on the storage medium 120. The event includes for example: a battery change event, a pause event, a memory space event, a light event and a system generated event. Further, the recording unit 110 can be configured to display a plurality of effects on a screen (i.e., display unit 160) of the electronic device 100. The plurality of effects can include for example, an animation effect, an effect to change visual parameters of at least one media frame, an effect to skip at least one media frame, an effect to secure at least one media frame, an effect to mask at least one region of interest (ROI) in at least one media frame, an effect to change a media format of at least one media frame, and an effect to switch among recording units of the electronic device 100. The visual parameters of at least one media frame may include for example brightness, resolution, blur, fade, zoom-in/zoom-out, No effect, etc. Further, changing the visual parameters of the at least one frame are explained in conjunction with the FIG. 4B and FIG. 5.

Further, the recording unit 110 can be configured to detect an effect selected from the plurality of effects displayed on the screen of the electronic device 100. The effect may be selected by the user/may be selected automatically by the processor 130. Furthermore, the recording unit 110 can be configured to apply the selected effect on at least one of at least one past media frame from a set of past media frames already recorded by the recording unit 110 and at least one future media frame from a set of future media frames to be recorded by the recording unit 110. Further, applying the selected effect on at least one of the at least one past media frame and the at least one future media frame (or the audio buffer) are explained in conjunction with FIGS. 6B-26.

The storage medium 120 includes a temporary storage medium 120a and a permanent storage medium 120b. The temporary storage medium 120a can be configured to store the set of past media frames and the set of future media frames in a temporary buffer, wherein the selected effect is applied on the at least one past media frame and the at least one future media frame in the temporary buffer before storing into the permanent storage medium 120b. The storage medium 120 may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the storage medium 120 may, in some examples, be considered a non-transitory storage medium. The term "non-transitory" may indicate that the storage medium is not embodied in a carrier wave or a propagated signal. However, the term "non-transitory" should not be interpreted that the storage medium 120 is non-movable. In some examples, the storage medium 120 can be configured to store larger amounts of information than the memory. In certain examples, a non-transitory storage medium may store data that can, over time, change (e.g., in Random Access Memory (RAM) or cache). The communication unit 180 communicates internally with the units and externally with networks.

In another embodiment, the recording unit 110 includes a first recording unit 110a, a second recording unit 110b, a media file generator 118, and sensor 112 (or sensor unit). The first recording unit 110a can be for example, a rear camera, a primary camera, a front camera, an audio sensor, etc. the second recording unit 110b can be for example, the rear camera, the primary camera, the front camera, the audio sensor, etc. The first recording unit 110a can be configured to record a first set of media frames. Further, the processor 130 can be configured to detect the event, and switch the first recording unit 110a into the second recording unit 110b in response to detecting the event, wherein the second recording unit 110b is configured to record a second set of media frames. The first set of media frames are recorded in a first media format and the second set of media frames are recorded in a second media format. Furthermore, the processor 130 can be configured to produce the media file comprising the first set of media frames and the second set of media frames.

Unlike conventional systems and methods, the proposed method can therefore allow the processor 130 to automatically switch the first recording unit 110a into the second recording unit 110b (or, vice-versa) based on the event (i.e., light event), whereby switching into the second recording unit 110b results in improving the resolution/visual parameters of the media frame.

In yet another embodiment, the recording unit 110 can be configured to detect the event in the electronic device 100 while recording the first set of media frames in the first media format on the temporary storage medium 120a. Further, the recording unit 110 can be configured to display a plurality of media formats on the screen of the electronic device 100. The plurality of formats can be for example, MP4, 3GP, AVI, GIF, VOB, WMV, JPEG, etc. Further, the recording unit 110 can be configured to detect a second media format selected from the plurality of media formats displayed on the screen of the electronic device 100. Further, the recording unit 110 can be configured to apply the second media format on at least one media frame from a set of second media frames to be recorded by the recording unit 110. Furthermore, the media file generator 118 can be configured to produce the media file comprising the first set of media frames in the first media format and the second set of media frames in the second media format.

Unlike the conventional systems and methods, the proposed media file generator 118 can produce a single media file including the plurality of media frames with different media formats.

The FIG. 1 shows a limited overview of the electronic device 100 but, it is to be understood that another embodiment is not limited thereto. Further, the electronic device 100 can include different units communicating among each other along with other hardware or software components. By way of illustration, both an application running on the electronic device 100 and the electronic device 100 can be the component.

Figure 2:
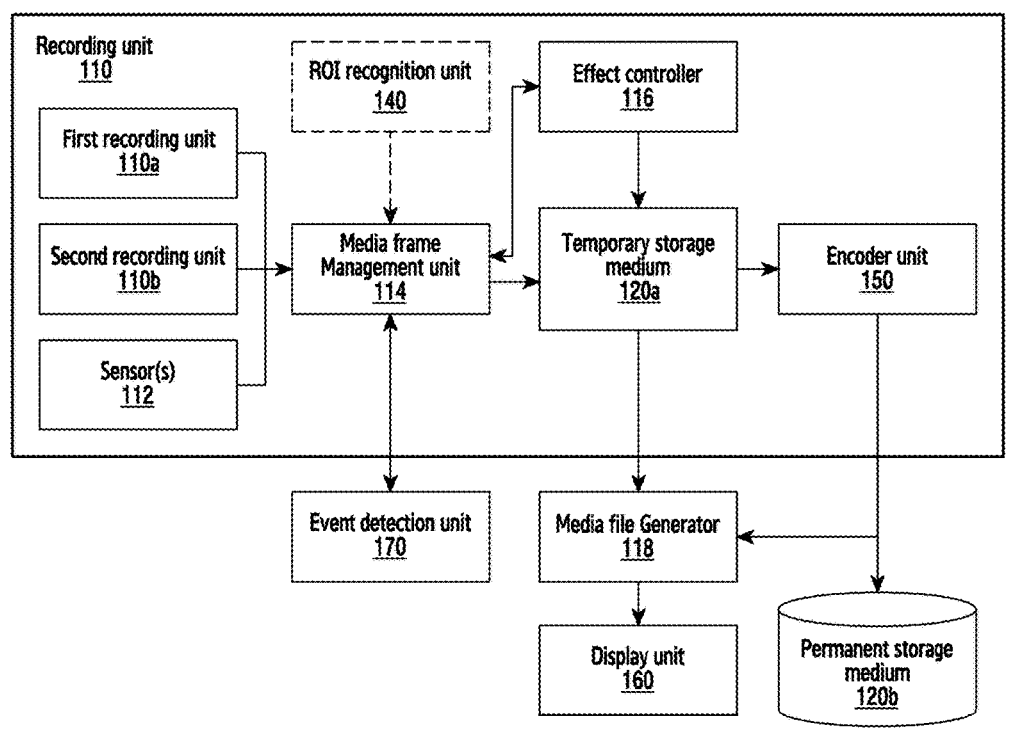
FIG. 2 is an architecture for performing various operations to produce a media file according to an embodiment of the present disclosure.

FIG. 2 illustrates an architecture for performing various operations to produce a media file according to an embodiment of the present disclosure.

Referring to the FIG. 2, the recording unit 110 may include the first recording unit 110a, the second recording unit 110b, the sensor unit 112, a media frame management unit 114, an effect controller 116, the media file generator 118, the encoder unit 150, the temporary storage medium 120a, and the ROI recognition unit 140.

The sensor unit 112 may include for example, an image sensor, camera circuit and modules to capture and process the media (e.g., image data, video data, audio data, etc.) outputted from the sensor unit 112. For example, the output of the sensor unit 112 may include graphics buffers containing the media content (i.e., media frames, audio buffers (or for e.g., audio tracks)), etc.).

The media frame management unit 114 may include the set of past media frames/audio buffers, the set of future media frames/audio buffer, the set of current media frames/audio buffers, etc.

The effect controller 116 may control the plurality of effects as described herein and may be configured to apply these effects. In another embodiment, the effect may also include changing the bit-rate of the at least one audio buffer, skipping the at least one audio buffer, changing the format of the at least one audio buffer, etc. Further, the effect controller 116 can be configured to apply one or more effect on the ROI preset by the user.

The display unit 160 may include for example a display panel, a display processor, a circuit, a display driver, and display interface APIs through which the graphics buffer is displayed on the display panel. While recording latest T+Nth media frame is visible on the display panel and with each queued media frame from the media content of the display panel changes.

In another embodiment, when recording is paused the T+Nth media frame is visible on the display panel due to queuing (of the media frame) the sensor unit 112 may stop recording, and the media content on the display panel remains static.

The ROI detection unit 140 may be configured to detect a preset object provided the user. The object may include for example, face in the media frame, any object of interest in the media frame, etc. The user may apply making effect/hide effect/or may skip the preset object in at least one of the past media frame from the set of the past media frames/in the at least one of the future media frame from the set of the future media frames. In another embodiment, the preset object can automatically be detected by the recording unit 110/processor 130 and may apply at least one of the aforementioned effect.

The encoder unit 150 may include for example, a video processor, a circuit, an encoder instruction module and API to process the graphics buffers through the encoder unit 150. Further, the encoder unit 150 may be configured to process raw buffers of the media frames outputted from the sensor unit 112 and encodes in specific format to store it on the permanent storage 130.

The temporary storage medium 120*a* includes more than one graphics buffers to collect the media frames outputted from the sensor unit 112 and thereafter may transmit the collected media frames to the display unit 160/encoder unit 150 for preview/encoding. During the media recording (through the recording unit 110) these graphics buffers are transmitted to the encoder unit 150 to encode in specific media format and the encoder output is stored in the media file on the permanent storage medium 120*b*. To apply effects on the past media frame, the media frame recorded i.e., up to the "N" number of graphics media frames may be temporary stored in the temporary storage medium 120*a* and send previous than "N" media frames from 0 to T media frames to the permanent storage medium 120*b* through a decoder unit (not shown).

The effect controller 116 may include a template containing the plurality of effects (or the required/selected effects from the plurality of effects) that may be applied to the graphics buffers from previous N frames. For example, if the effect required to insert between two scenes new buffer containing effect template can be queued after (T+N)th buffer. When the user resumes recording, the future media frames (from the sensor unit 112) may be queued in the "N" temporary buffers and it will be processed with the effect template selected during the pause event and is passed to the encoder unit 150.

In yet another embodiment, the recording unit 110 may include a media frame selection unit 114 configured to receive an input to select media frame (at least one past media frame from the set of past media frames) to which the user may apply the effect. Further, the recording unit 110 may include an event detection unit 170 configured to detect the at least one event and thereupon the recording unit 110 may trigger the effect controller 118 to display the plurality of effects on the display panel. The effect may be automatically applied by the processor 130.

Figure 3:
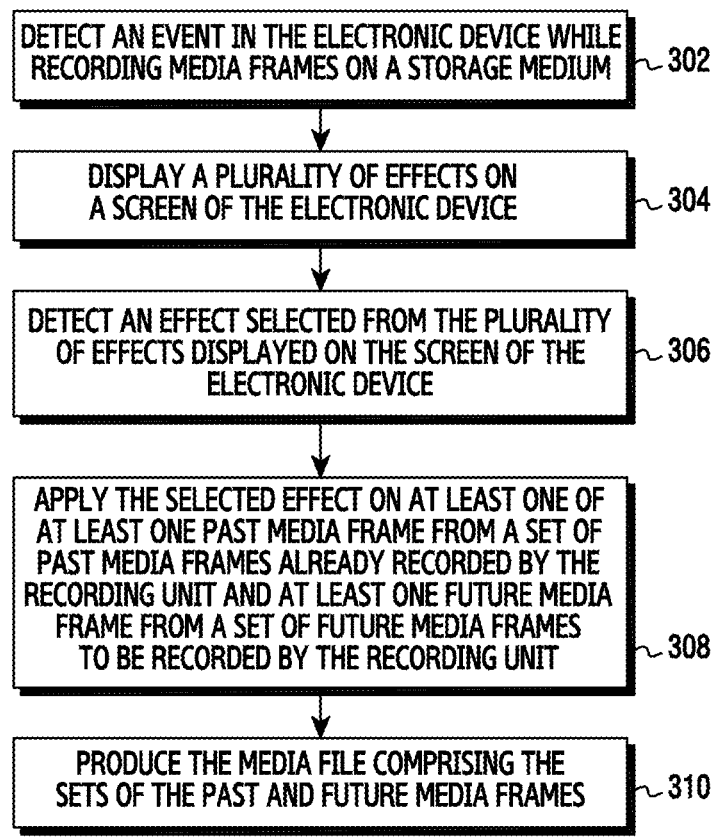
FIG. 3 is a flow diagram illustrating a method for producing a media file according to an embodiment of the present disclosure.

FIG. 3 is a flow diagram 300 illustrating a method for producing a media file according to an embodiment of the present disclosure.

Referring to the FIG. 3, in step 302, the electronic device 100 detects the event while recording the media frames on the temporary storage medium 120*a*. For example, in the electronic device 100, as illustrated in the FIG. 1, the recording unit 110 is configured to detect the event in the electronic device 100 while recording the media frames on the temporary storage medium 120*a*.

In step 304, the electronic device 100 displays the plurality of effects on the screen of the display unit 160. For example, in the electronic device 100, as illustrated in the FIG. 1, the recording unit 110 is configured to display the plurality of effects on the screen of the display unit 160.

In step 306, the electronic device 100 detects the effect selected from the plurality of effects displayed on the screen of the display unit 160. For example, in the electronic device 100, as illustrated in the FIG. 1, the recording unit 110 is configured to detect the effect selected from the plurality of effects displayed on the screen of the display unit 160.

In step 308, the electronic device 100 applies the selected effect on at least one of the at least one past media frame from the set of past media frames already recorded by the recording unit 110 and the at least one future media frame from the set of future media frames to be recorded by the recording unit 110. For example, in the electronic device 100, as illustrated in the FIG. 1, the recording unit 110 is configured to apply the selected effect on at least one of the at least one past media frame from the set of past media frames already recorded by the recording unit 110 and the at least one future media frame from the set of future media frames to be recorded by the recording unit 110.

In step 310, the electronic device 100 produces the media file comprising the sets of the past and future media frames. For example, in the electronic device 100, as illustrated in the FIG. 1, the media file generator 110 is configured to produce the media file comprising the sets of the past and future media frames.

The various actions, acts, blocks, steps, or the like in the flow chart 300 may be performed in the order presented, in a different order or simultaneously. Further, in some embodiments, some of the actions, acts, blocks, steps, or the like may be omitted, added, modified, skipped, or the like without departing from the scope of the invention.

Figure 4A:
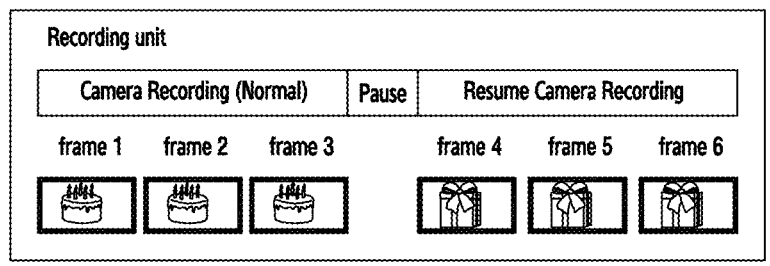
FIG. 4A illustrates a recording of a plurality of media frames according to a prior art.

FIG. 4A illustrates a recording of a plurality of media frames according to a prior art.

Referring to the FIG. 4A, consider a scenario where the recording unit 110 records the media content using the sensor unit 112 and detects the pause event and thereafter detects the input to resume the recording of another scene (i.e., media frame). The recording unit 110 prepares both the scenes in the media file and the user may employ/use an external apparatus (i.e., media editing apparatus) in order to modify the media file (i.e., the media frames inside the media file) and to apply the transition effects between the two scenes.

Figure 4B:
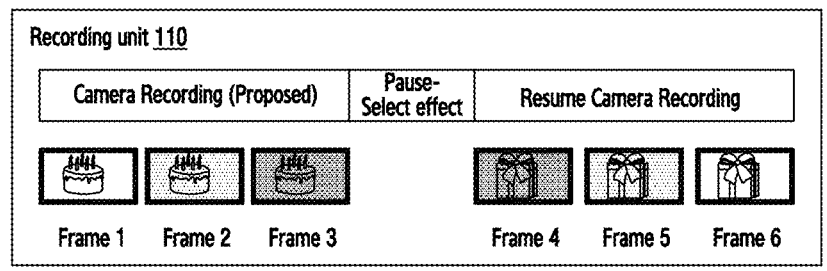
FIG. 4B illustrates an operation for altering visual parameters of at least one media frame according to an embodiment of the present disclosure.

FIG. 4B illustrates an operation for altering visual parameters of at least one media frame according to an embodiment of the present disclosure.

Unlike the conventional systems and methods as detailed in FIG. 4A, the proposed effect controller 116 (of the recording unit 110) can therefore allow the user to select the effect (change the brightness/transition effect/animation effect) while the recording is paused and apply the selected effect between two scenes without accessing/modifying previous part of the media file in the permanent storage 120*b*. Thus, when the recording unit 110 detects the input to resume recording, the Dim effect selected by the user during the pause event continues to be applicable on the future media frames i.e., as shown in the FIG. 4B the next three media frames (future media frames 4-6) are slowly appearing from dark with increasing color brightness. The effect continues unless different effect is applied/till the duration of the Dim effect.

In another example, of the FIG. 4B, the proposed recording unit 110 can be used for recording family video which includes multiple pause-resume events while recording the video. The user can change, by way of the proposed effect controller 116, the visual parameters such as: dim effect for scene transition, brightness change, blur effect, etc.

In yet another example, of the FIG. 4B, during the recording of any events such as for example: convocation award functions the user records one student for collecting degree/award and then applies pause the recording to wait for a second student. If the second student is topper then the user can select, by way of the effect controller 116, the effect of glittering stars and flower/petals effects for the second student.

In further yet another example, of the FIG. 4B, the user (i.e., cook) can leverage the proposed recording unit 110 by applying a pause event, to the videos during the recording, each time when the user need to add ingredients and wait for the recipe to be ready for next ingredient. The user can select slow transition effect while pause which may produce a meaningful video content instead of direct resumed video.

Although the above illustrated example(s) are explained to apply the effect while the recording is paused but it is not limited thereto. The one or more effect to the at least one media frame can even be applied while the media is recording i.e., without any pause event.

In another embodiment, the user recording the audio buffers using audio recorder (i.e., first recording unit 110a/second recording unit 110b) can pause the audio recording to apply any audio effect, selected from the plurality of audio effects displayed on the display unit 160, between two audio buffers recorded between these pause events.

Figure 5:
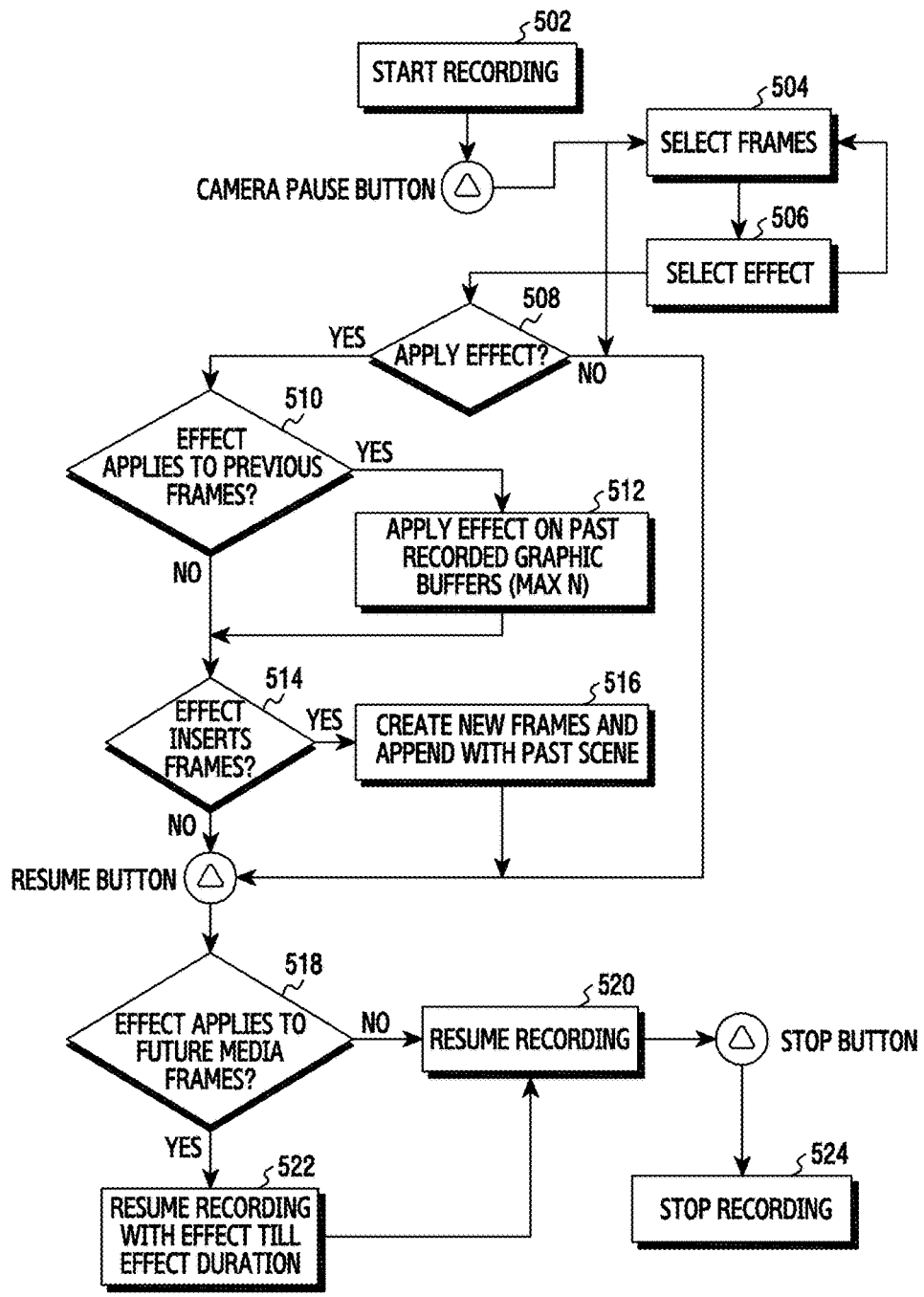
FIG. 5 is a flow diagram illustrating a method for applying effect in middle of media recording according to embodiment of the present disclosure.

FIG. 5 is a flow diagram 500 illustrating a method for applying effect in middle of media recording while the media recording is paused according to embodiment of the present disclosure.

Referring to the FIG. 5, in step 502, the electronic device 100 starts recording the media frames. For example, in the electronic device 100, as illustrated in the FIG. 1, the sensor unit 112 of the recording unit 110 starts recording the media frames. During the media recording the event detection unit 170 may detect the pause event. The event detection unit 170 can be configured to detect the event automatically (system generated event) or based on the input provided by the user.

In step 504, the media management unit 114 is configured to detect an input performed by the user to select the media frame. In step 506, the effect controller 116 is configured to detect an input performed by the user to select the effect, from the plurality of effects displayed on the screen of the electronic device 100. In step 508, the recording unit 110 is configured to determine whether the selected effect is to be applied on the media frame. If at step 508, the recording unit 110 determines that the selected effect must be applied to the media frame, then, in step 510, the recording unit 110 determines, based on the input detected by the recording unit 110, whether the selected effect is to applied to the past media frame.

If at step 510, the recording unit 110 determines that the selected effect has to be applied to even the past media frame (or at least one past media frame from the set of past media frame), then in step 512, the selected effect is applied on the past media frame (i.e., past recorded graphics buffer (max "N")). If at step 510, the recording unit 110 determines that the selected effect should not be applied to the past media frame, then in step 514, the recording unit 110 determines, based on another input detected by the recording unit 110, the effect to insert media frame, then in step 516, the recording unit 110 may create new media frames and append with the past media frames.

If at step 514, if the recording unit 110 determines that there is no input to insert media frames, then the recording unit 110 detects the input to resume the recording of the media frame. In step 518, the recording unit 110 determines whether the effect should be applied to the future media frames, if at step 518, the recording unit 110 determines that the effect is to applied event to the future media frames, then in step 522, the recording of the media frame may be resumed with the applied effect till the effect duration. If at step 518, if the recording unit 110 determines that no effect is to applied to the future media frames, then in step 520, the recording unit 110 resumes the media recording. Once the media recording is completed, then, the in step 524, the recording unit 110 stops the media recording.

If the user has recorded the first scene of video using camera for about 1 minute and paused recording to prepare for another scene. Then, the pause screen of camera application will have an option to select effects from a list. User can select from predefined effects or choose no effect. When no effect is selected then it will simply continue recording the next scene without effects. When predefined effects are selected then the effects are applied on the at least one past frame, insert effect frames (based on effect type) and apply effect on frames from next scene after recording.

As described below, the user can select previous/future/middle frames to apply effect onto. After selecting frames user can select effect to apply onto selected frames. User can select multiple effects on same media frames.

Figure 6:
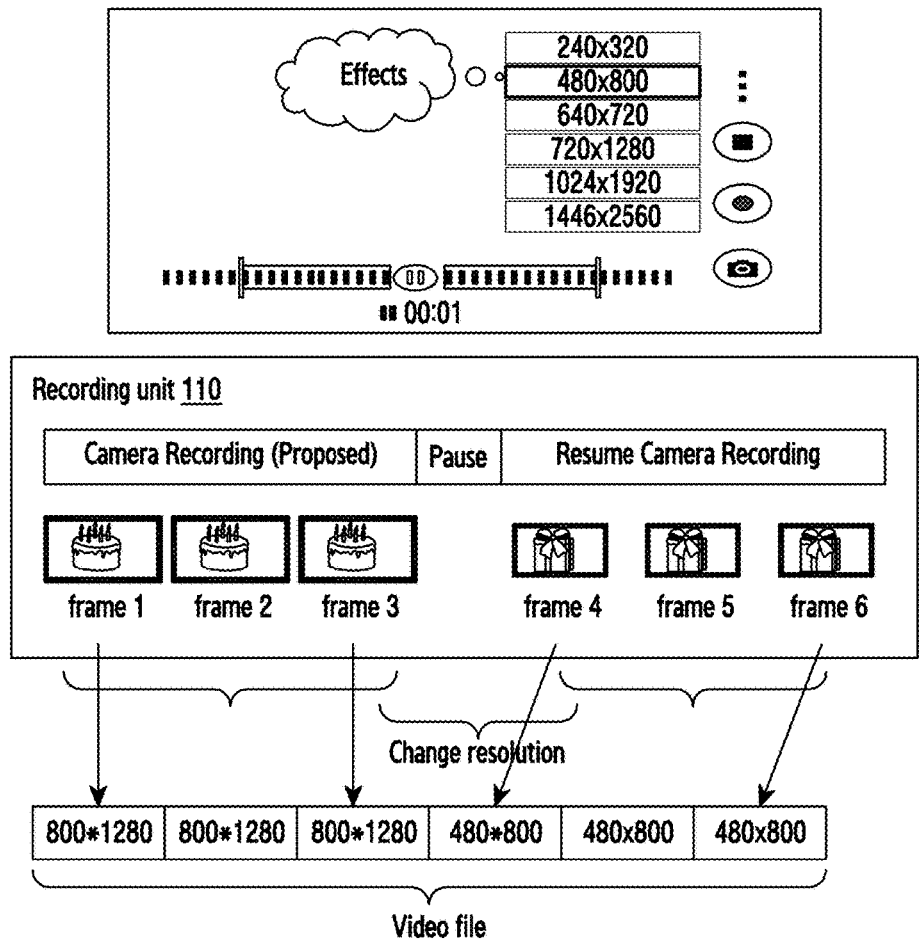
FIG. 6 illustrates an operation for changing a resolution of media frames in middle of recording according to an embodiment of the present disclosure.

Resolution Effect:

Change the resolution of the media frame in middle of recording while the media recording is paused: FIG. 6 illustrates an operation for changing a resolution of media frames in middle of recording according to an embodiment of the present disclosure.

Referring to FIG. 6, in order to change the quality of the media frame during (or, in middle of) the pause event and resume event of the media recording, the resolution of the media frame can be changed, by way of the proposed method, before resuming the media recording assuming that the encoder unit 150 is using such a media format which supports multi resolution. Since "N" graphics buffers of fix resolution e.g. 800×1280 are in the temporary storage medium 120a, these "N" graphics buffers may be flushed to the encoder unit 150 to store on the permanent storage medium 120b and the temporary buffers will be deleted/marked to be deleted. Thus, the recording unit 110 with low resolution e.g. 480×800 buffers can be allocated to record the media frames after resuming the media recording. The configuration of the sensor unit 112 and the encoder unit 150 may be updated according to the new resolution (i.e., 480×800) and the user can resume the media recording with the new resolution.

Figure 7:
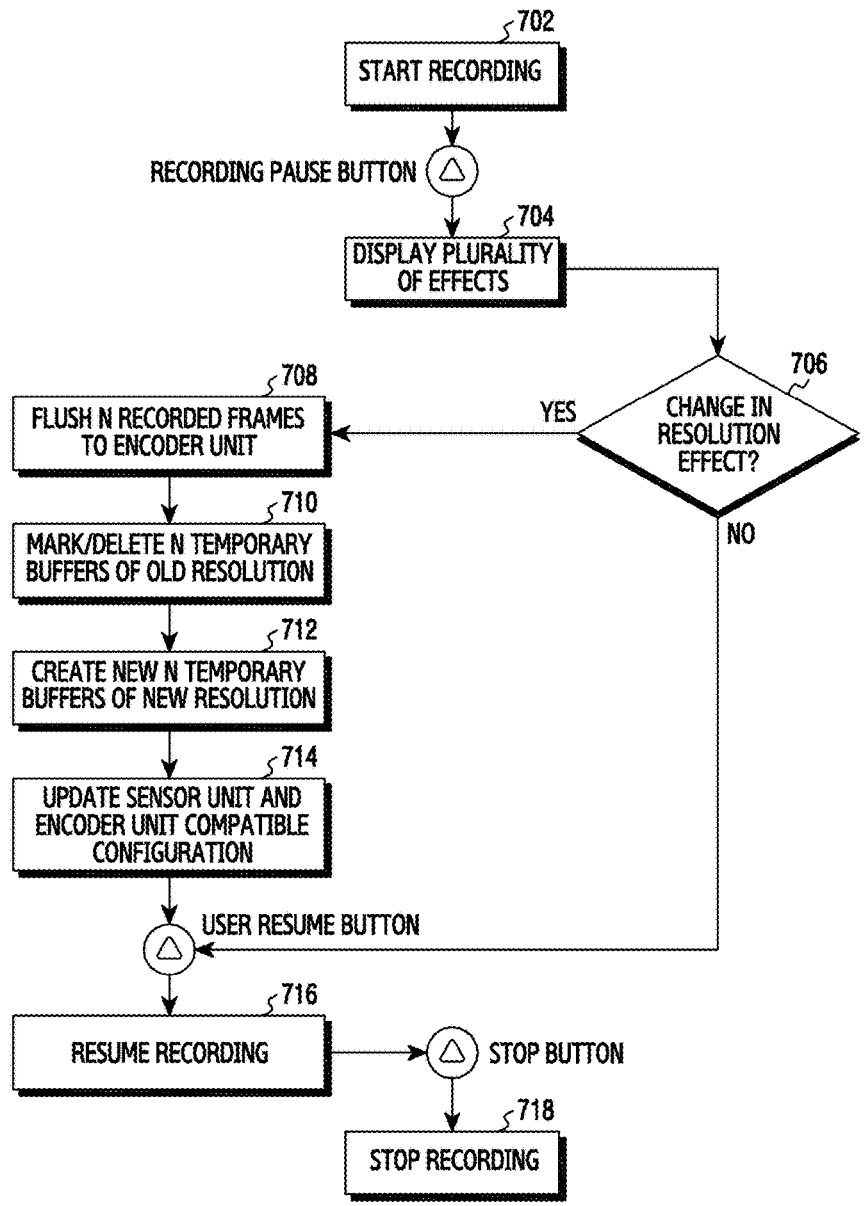
FIG. 7 is a flow diagram illustrating a method for changing a resolution of media frames according to embodiment of the present disclosure.

FIG. 7 is a flow diagram 700 illustrating a method for changing a resolution of at least one media frame according to embodiment of the present disclosure.

Referring to the FIG. 7, in step 702, the electronic device 100 starts recording the media frames. For example, in the electronic device 100, as illustrated in the FIG. 1, the sensor unit 112 of the recording unit 110 starts recording the media frames. During the media recording the event detection unit 170 may detect the pause event. The event detection unit 170 can be configured to detect the event automatically (system generated event) or an input provided by the user.

Once the pause event is detected, in step 704, the electronic device 100 displays the plurality of effects i.e., the plurality of visual parameters (i.e., resolution effect). For example, in the electronic device 100, as illustrated in the FIG. 1, the recording unit 110 is configured to communicate with the display unit 160 to display the plurality of effects.

In step 706, the electronic device 100 determines whether the instructions/input to change the resolution of the at least one media frame is received. For example, in the electronic device 100, as illustrated in the FIG. 1, the recording unit 110 is configured to determine whether the instructions/input to change the resolution of the at least one media frame is received.

If at step 706, the electronic device 100 receives the instructions to change the resolution of the at least one media frame, then, in step 708, the electronic device 100 flushes "N" recorded media frames to the encoder unit 150. For example, in the electronic device 100, as illustrated in the FIG. 1, the recording unit 110 is configured to flush N" recorded media frames to the encoder unit 150.

In step 710, the electronic device 100 deletes/mark "N" temporary graphics buffer of the media frame including the old resolution effect. For example, in the electronic device 100, as illustrated in the FIG. 1, the recording unit 110 is configured to deletes/mark "N" temporary graphics buffer of the media frame including the old resolution effect.

In step 712, the electronic device 100 creates new "N" temporary graphics buffer of the media frame including the new resolution effect (selected/required). For example, in the electronic device 100, as illustrated in the FIG. 1, the recording unit 110 is configured to create the new "N" temporary graphics buffer of the media frame including the new resolution effect (selected/required).

In step 714, the electronic device 100 updates the sensor unit 112 (i.e., camera module) and the encoder unit 150 compatible information. For example, in the electronic device 100, as illustrated in the FIG. 1, the recording unit 110 is configured to update the sensor unit 112 (i.e., camera module) and the encoder unit 150 compatible information.

If at step 706, the electronic device 100 determines that there are no instructions/input detected (by the processor 130/recording unit 110) then, the user resumes the media recording (by providing an input to the resume record button). In step 716, the electronic device 100 resumes the media recording. Once the media recording is completed, then, the in step 718, the electronic device 100 stops the media recording.

Figure 8:
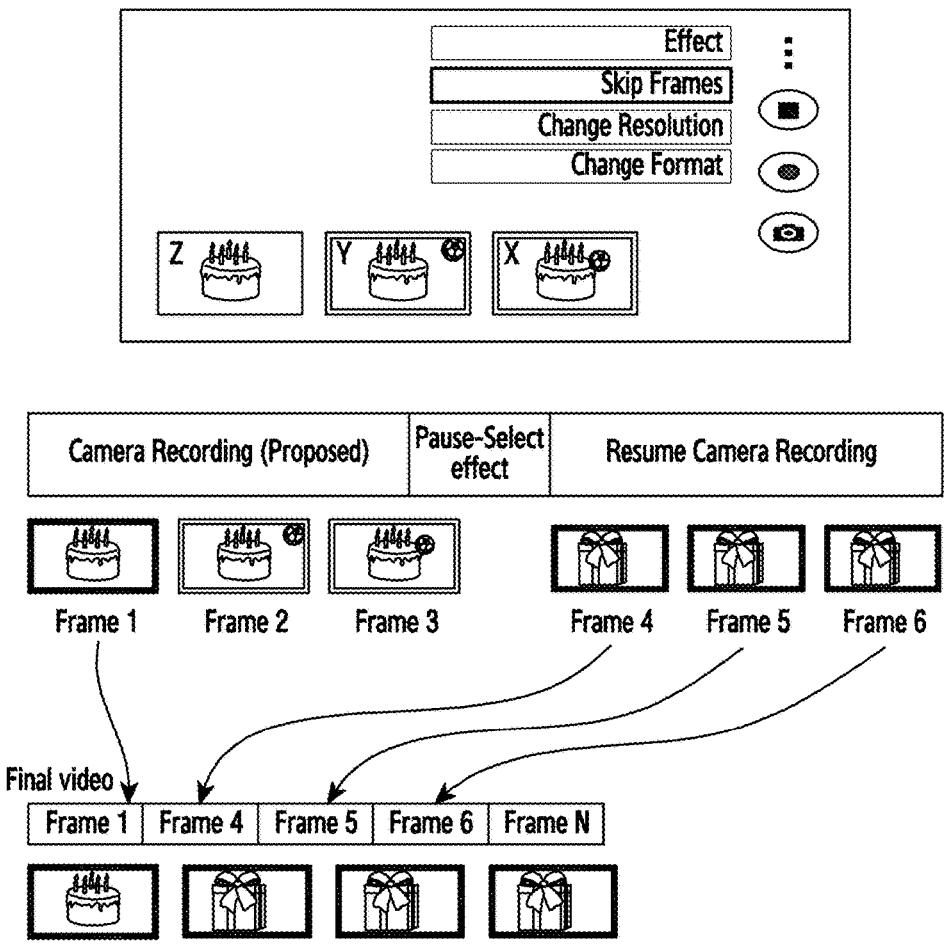
FIG. 8 illustrates an operation for skipping at least one media frame in middle of recording according to an embodiment of the present disclosure.

FIG. 8 illustrates an operation for skipping at least one media frame according to an embodiment of the present disclosure.

Referring to the FIG. 8, once the recording unit 110 receives the input to: stop the recording of the media frame and to mark/delete/skip the media frame, the media management unit 114 may therefore display the list of past media frames on the display unit 160, thereon, the user can select the at least one past media frame to be skipped from the media recording. Since "N" temporary buffers are in the temporary storage medium 120a, the user can select max "N" past media frames to skip from the recording. As shown in the FIG. 8, the frames 2 and 3 are skipped, by way of the propose method, from the final set of media frames.

Further, as shown in the FIG. 8, the media frame with an obstacle in view (as seen in frame "X") can be skipped partially (a seen in frame "Y") or can be skipped completely (as shown in frame "Z").

Figure 9:
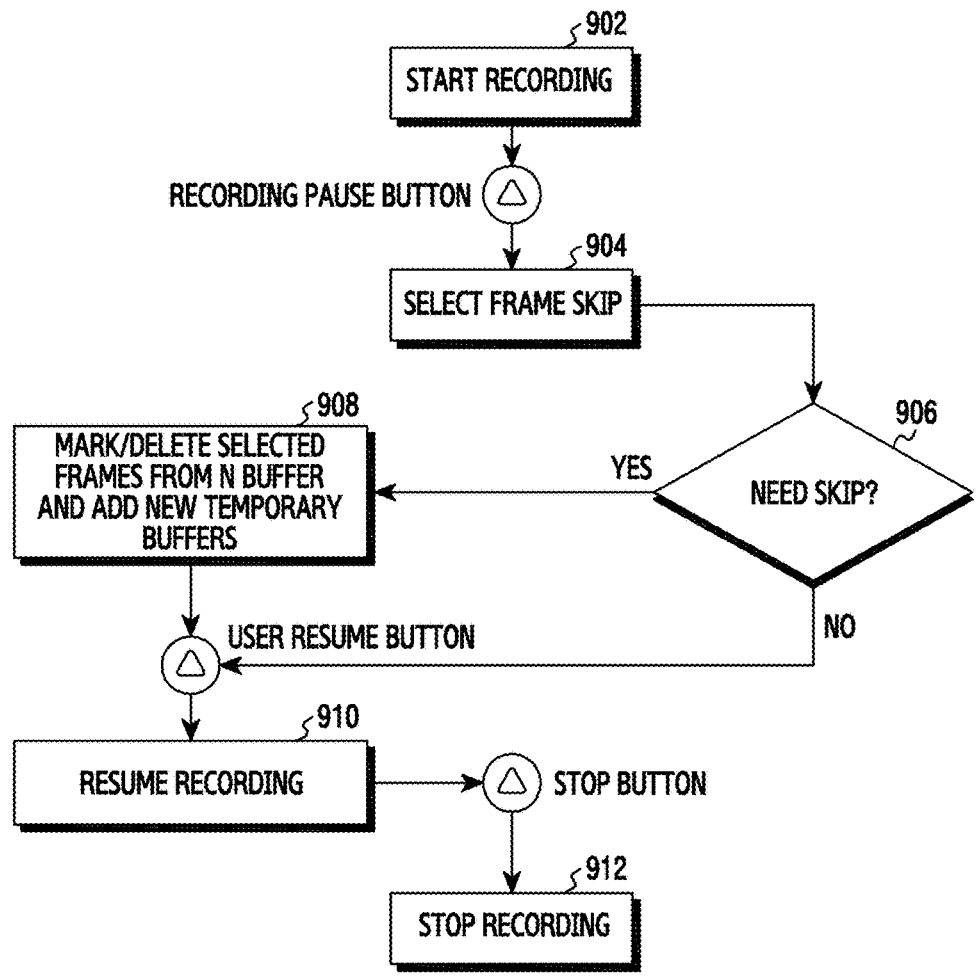
FIG. 9 is a flow diagram illustrating a method for applying an effect to skip at least one past media frame according to an embodiment of the present disclosure.

FIG. 9 is a flow diagram 900 illustrating a method for applying an effect to skip at least one past media frame according to an embodiment of the present disclosure.

Referring to the FIG. 9, in step 902, the electronic device 100 starts recording the media frames. For example, in the electronic device 100, as illustrated in the FIG. 1, the sensor unit 112 of the recording unit 110 starts recording the media frames. During the media recording the event detection unit 170 may detect the pause event. The event detection unit 170 can be configured to detect the event automatically (system generated event) or an input provided by the user.

In step 904, the recording unit 110 is configured to detect an input performed by the user to select the at least one past media frame to be skipped from the set past media frames displayed on the screen of the electronic device 100. In step 906, the recording unit 110 determines whether the at least one past media frame selected need to be skipped. If at step 906, the recording unit 110 determines that the at least one past media frame selected is to be skipped, then in step 908, the recording unit 110 skips the selected media frame from "N" graphics buffer. If at step 906, the recording unit 110 determines that the at least one past media frame selected shouldn't be skipped, then in step 910, the recording unit 110 resumes the media recording. Once the media recording is completed, then, the in step 912, the recording unit 110 stops the media recording.

Figure 11A:
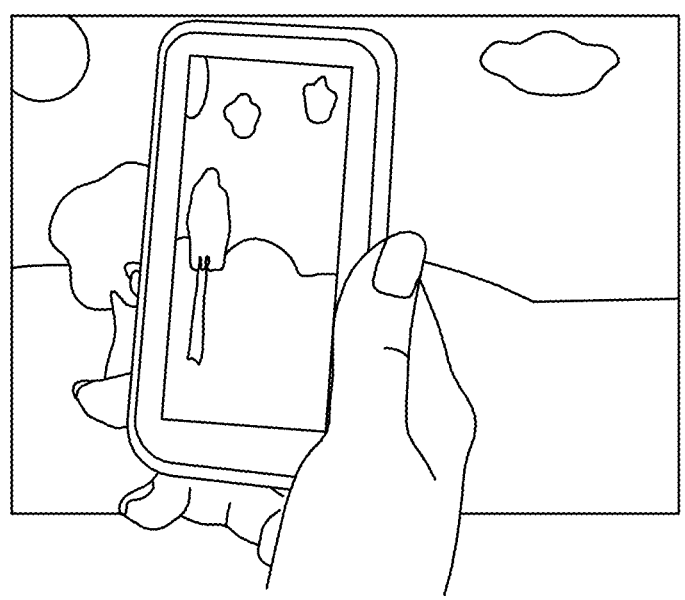
FIGS. 11A-11C illustrates an operation for applying an effect to at least one media frame during a battery change event according to an embodiment of the present disclosure.
Figure 11B:
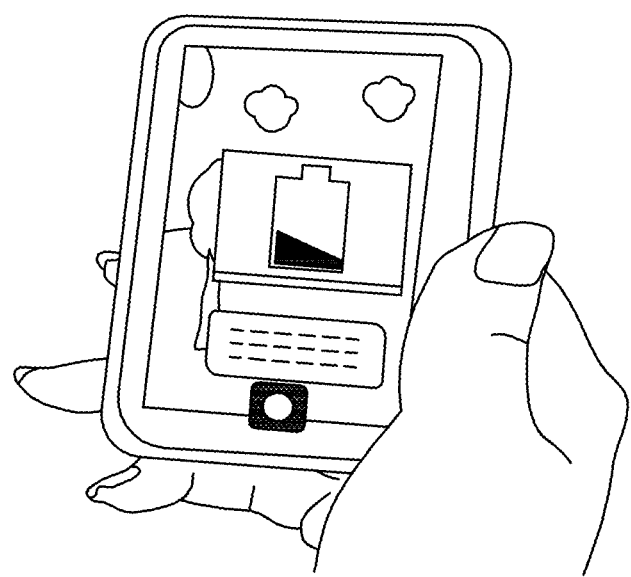
Figure 11C:
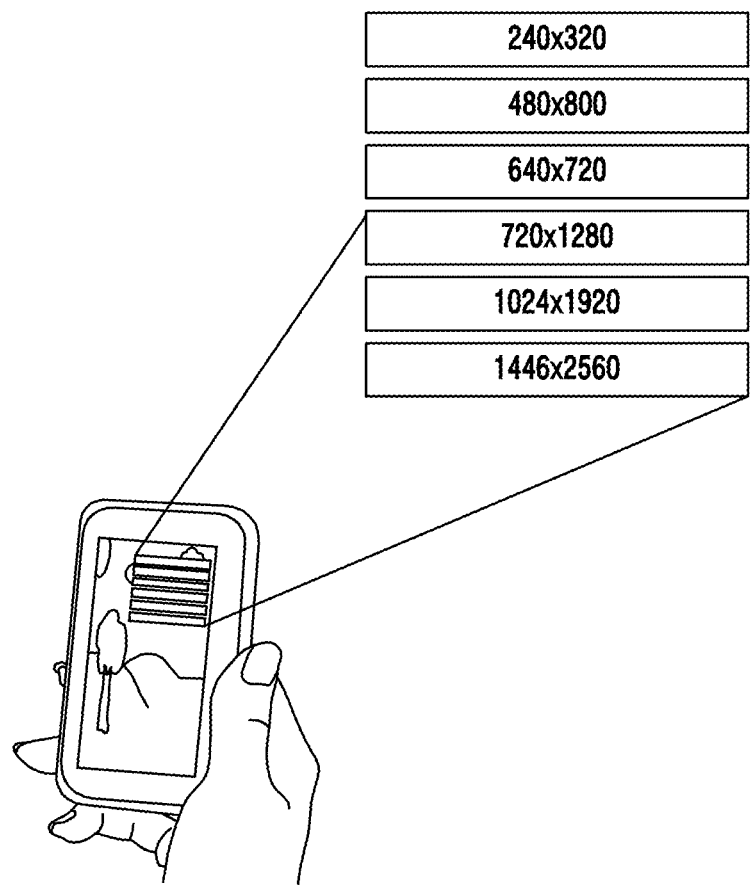

FIGS. 11A-11C illustrates an operation for applying an effect during a battery change event according to an embodiment of the present disclosure.

Referring to the FIGS. 11A-11C, consider the user recording the media frame, during the media recording if the event detection unit 170 detects the battery change event (e.g., battery low) then the recording unit 110 may be configured to display at least one notification (e.g., pop-up) including the information of the current battery level (as shown in the FIG. 11B) and the plurality of effects such as, for example; plurality of resolution formats (as shown in the FIG. 11C). The user can therefore select the at least one resolution format, from the plurality of the resolution or formats, to be applied and continue the recording without any interruptions. Thus, the user by selecting the lower resolution format can resume the recording of the media (i.e., video) which explicitly prolongs the battery life and also the recording.

In the aforementioned examples and in the following examples, the one or more effect can be selected by the user/automatically selected by the processor 130/recording unit 110.

Figure 12A:
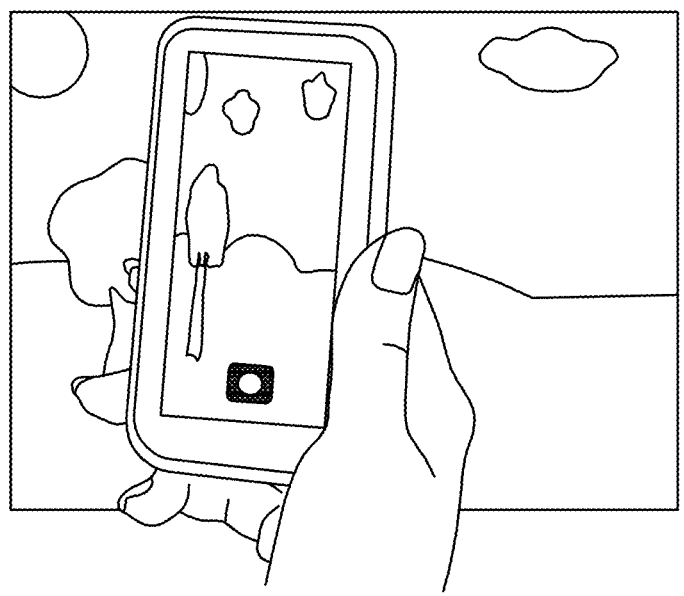
FIGS. 12A-12C illustrates an operation for applying an effect to at least one media frame during a disk space event according to an embodiment of the present disclosure
Figure 12B:
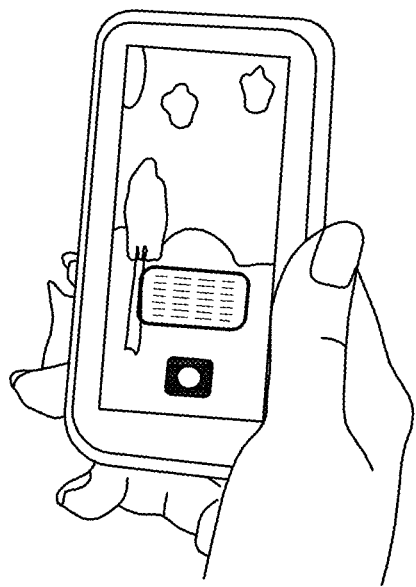
Figure 12C:
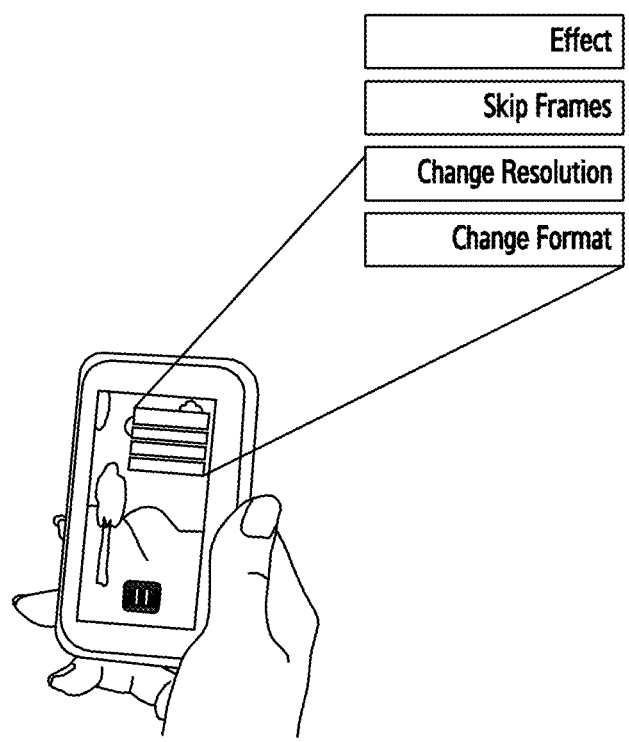

FIGS. 12A-12C illustrates an operation for skipping at least one media frame (or, audio buffer) during a disk space (i.e., memory) event according to an embodiment of the present disclosure.

Referring to the FIGS. 12A-12C, consider the user recording the media frame, during the media recording (i.e., middle of the media recording) if the recording unit 110/processor 130 detects change in the disk space (low/high) then the recording unit 110 may be configured to display at least one notification including the information of the disk space (device memory status, as shown in the FIG. 12B) and the plurality of effects such as, for example; effect, skip frames, change resolution (as shown in the FIG. 12C). The user can therefore select the at least one resolution/format/skip at least one frame from the set of past media frames in order to maintain the disk space.

Figure 13A:
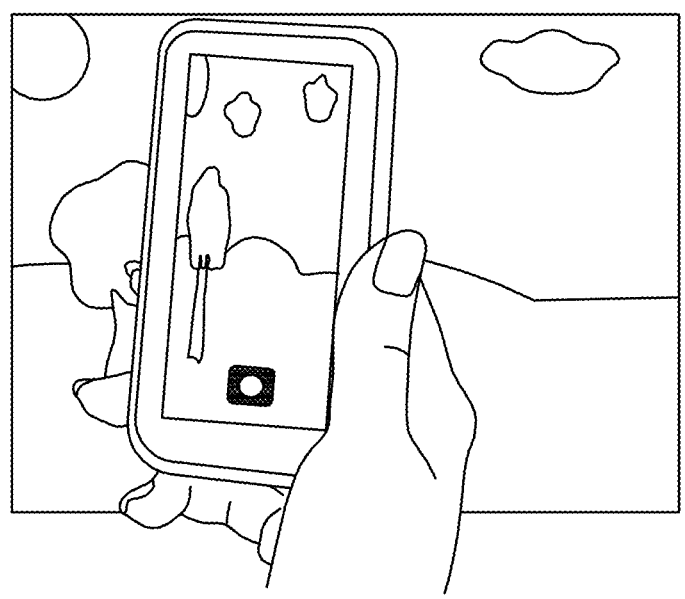
FIGS. 13A-13C illustrates an operation for securing at least one media frame according to an embodiment of the present disclosure.
Figure 13B:
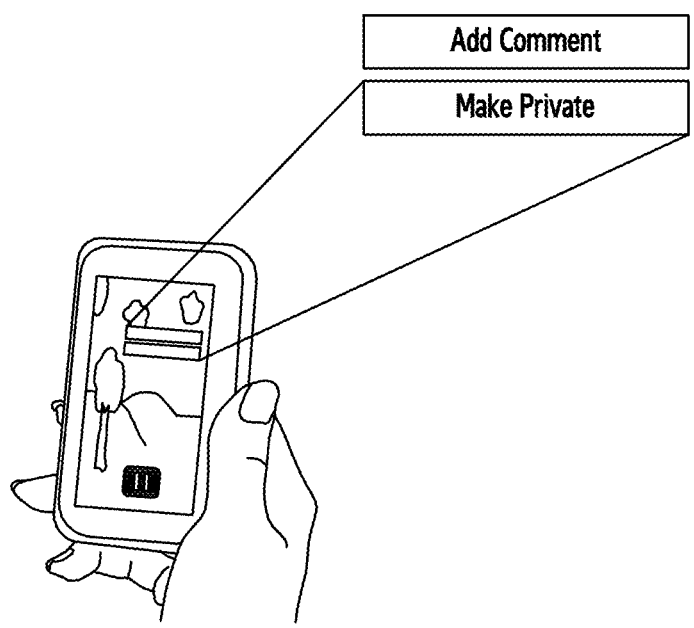
Figure 13C:
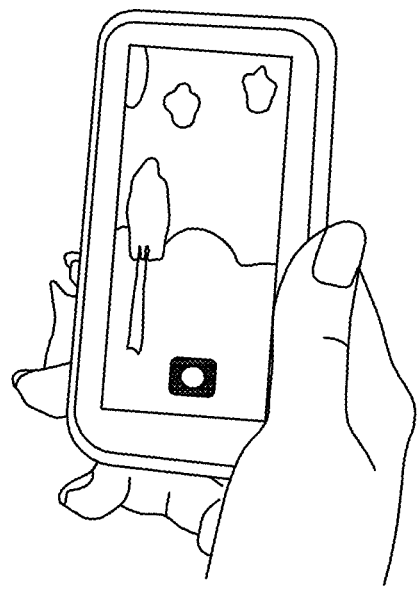

FIGS. 13A-13C illustrates an operation for securing at least one media frame (or, audio buffer) according to an embodiment of the present disclosure.

Referring to the FIGS. 13A-13C, consider the user recording the media frame, during the media recording if the recording unit 110/processor 130 detects an input from the user to secure least one portion of the media frame/to add any comment on the at least one portion of the media frame. The recording unit 110 may therefore allow the user to make the at least one portion of the media frame as the private portion.

Audio Effect

Figure 14:
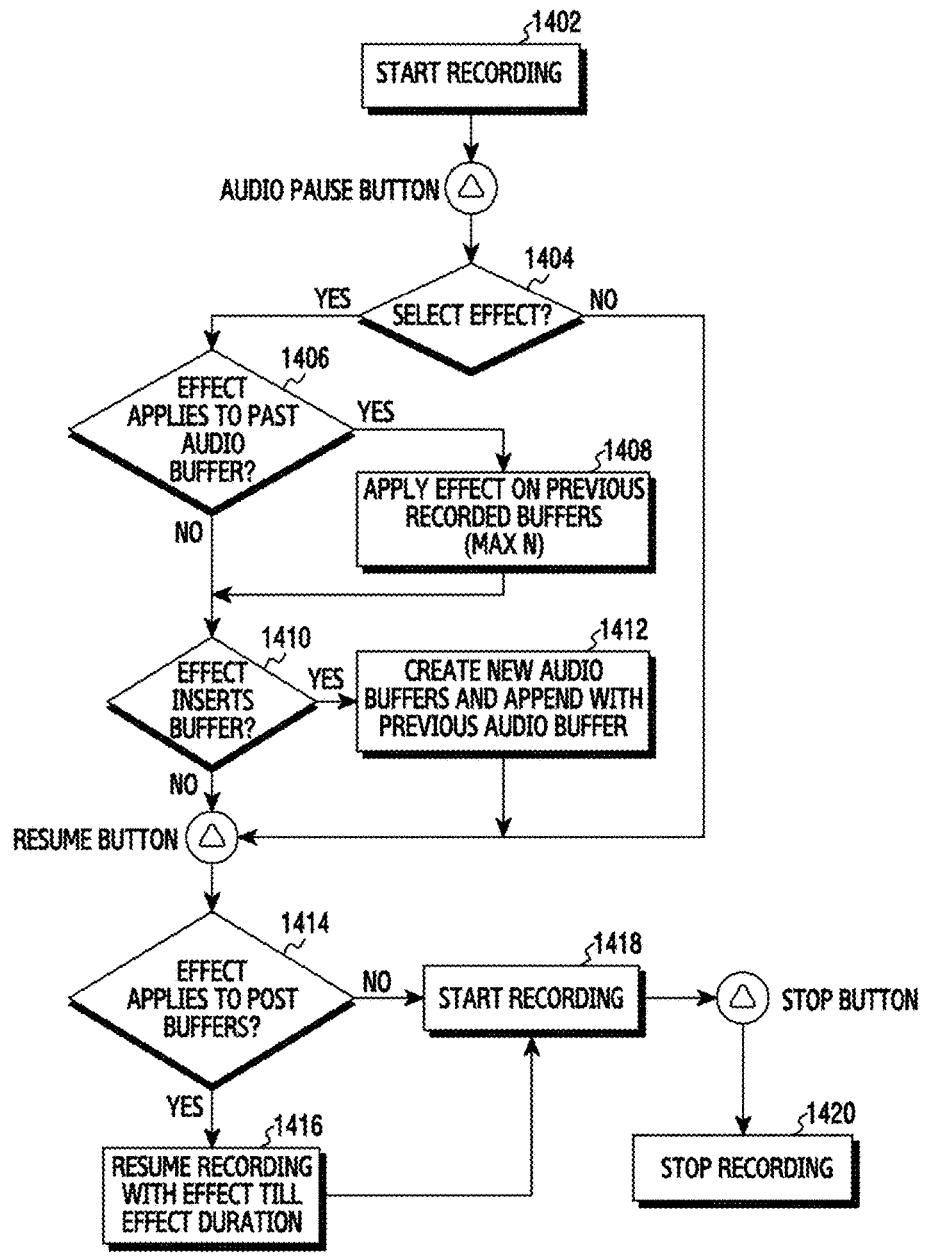
FIG. 14 is a flow diagram illustrating a method for applying at least one effect to the audio buffer while audio recording is paused according to an embodiment of the present disclosure.

FIG. 14 is a flow diagram 1400 illustrating a method for applying at least one effect to at least one audio buffer while audio recording is paused according to an embodiment of the present disclosure.

Once the recording unit 110 detects the pause event while recording the audio buffers, the display unit 160, based on the detected paused event, may display the plurality of effects to the user. The user can select from at least one effect from the plurality of effects (i.e., no color effect, skip audio buffer, change format, etc.). When no effect is selected then it will simply continue recording the next audio buffer without effects. Unlike the conventional systems and methods, the proposed method allows the recording unit 110 to apply the selected effect on the at least one past audio buffer and can apply the selected effect on the at least one future audio buffer.

In another embodiment, the plurality of effects can be pre-defined by the effect controller 116, or the plurality of effects may include a user defined effects i.e., customized by the user by combining the one or more effects from the plurality of effects.

Referring to the FIG. 14, in step 1402, the electronic device 100 starts recording the audio buffers. For example, in the electronic device 100, as illustrated in the FIG. 1, the recording unit 110 starts recording the audio buffers. During the audio (i.e., media) recording the event detection unit 170 may detect the pause event. The event detection unit 170 can be configured to detect the event automatically (system generated event) or an input provided by the user.

In step 1404, the recording unit 110 is configured to determine whether an input to select the effect to be applied on the audio buffer is detected. If at step 1404, the recording unit 110 detects the input to apply the selected effect on the audio buffer during the recording then, in step 1406, the recording unit 110 determines, based on the input detected by the recording unit 110, whether the selected effect is to applied to the past audio buffer.

If at step 1406, the recording unit 110 determines that the selected effect has to be applied to even the past audio buffer (or at least one past audio buffer from the set of past audio buffer), then in step 1408, the selected effect is applied on the past audio buffer (i.e., past recorded audio buffer (max "N")). If at step 1406, the recording unit 110 determines that the selected effect should not be applied to the past audio buffer, then in step 1410, the recording unit 110 determines, based on another input detected by the recording unit 110, the effect to insert new audio buffer, then in step 1412, the recording unit 110 may create new audio buffer and append with previous audio buffers.

If at step 1410, the recording unit 110 determines there is no input to insert the new audio buffer, then the recording unit 110 detects the input to resume the recording of the audio buffers. In step 1414, the recording unit 110 determines whether the effect applies to the future (i.e., post) audio buffers, if at step 1414, the recording unit 110 determines that the effect is to applied to the future audio buffers, then in step 1416, the recording of the audio buffers may be resumed with the applied effect till the effect duration. If at step 1414, if the recording unit 110 determines that no effect is to applied to the future audio buffers, then in step 1418, the recording unit 110 resumes the audio recording. Once the audio recording is completed, then, the in step 1420, the recording unit 110 stops the audio recording.

For example, there are more than one audio buffers in the temporary storage medium 120a to collect PCM data from the recording unit 110 (i.e., audio unit) and thereafter may transmit the collected PCM data to the encoder unit 150 for encoding. When recording is started these audio buffers are sent to the encoder unit 150 to encode in specific audio format and encoder output is stored in a file (i.e., media file) on the permanent storage 120b. To apply effects on the previous audio buffers, the recording unit 110 may maintain the N number of audio buffers in the temporary storage medium 120a and send previous than "N" audio buffers from 0 to T buffers to the permanent storage medium 120b through the encoder unit 150. A template containing required effect will be applied to audio buffers from previous N buffers. If effect required to insert between two new audio buffer containing effect template can be queued after (T+N) th buffer. When user resumes recording the upcoming PCM data from the audio unit will be queued in N temporary buffers and it will be processed with effect template selected during pause and further it will be passed to the encoder unit 150.

The audio unit may include for example, an audio device, circuit and audio instructions to capture and process the audio data coming from the audio unit. Output of the audio unit may include audio buffers containing audio content in PCM digital format.

The encoder unit 150 may include for example an audio processor, circuit, encoder module and API to process audio buffers through the encoder unit 150. The encoder unit 150 processes raw buffers of audio buffers coming from the audio unit and encodes in specific format to store it on the permanent storage 120b.

Figure 15:
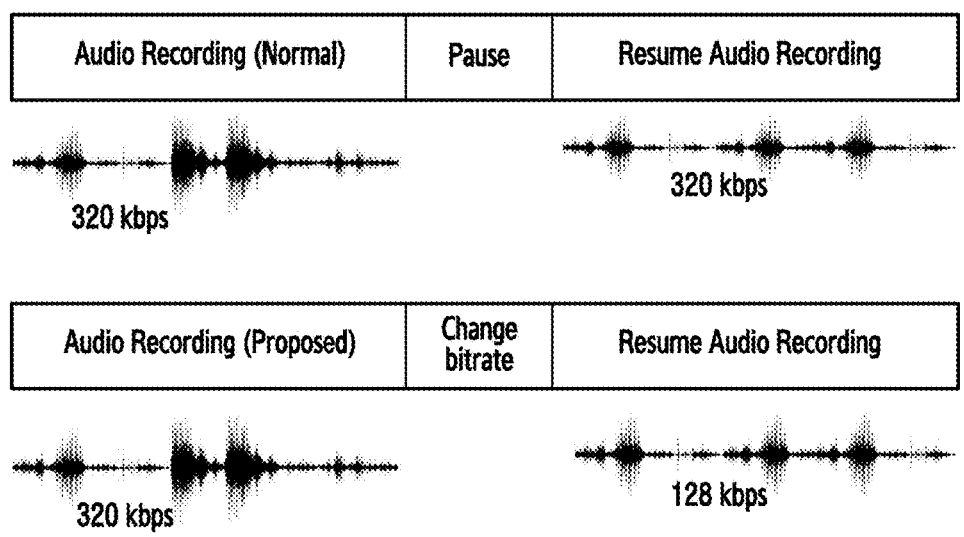
FIG. 15 illustrates an operation for changing a bit rate of at least one audio buffer according to an embodiment of the present disclosure.

Change the bit rate of audio in middle of recording while audio recording is paused: FIG. 15 illustrates an operation for changing a bit rate of at least one audio buffer according to an embodiment of the present disclosure.

Referring to FIG. 15, the recording unit 110 can be configured to change the bit rate of audio buffers before resuming the recording assuming that the encoder unit 150 is using such a format which supports variable bit rate. Since "N" audio buffers in the temporary storage medium 120a, these "N" audio buffers may be flushed to the encoder unit 150 to store on the permanent storage medium 120b. The configuration of the audio unit and the encoder unit 150 may be updated according to new bit rate and user can resume recording with new bit rate.

Figure 16:
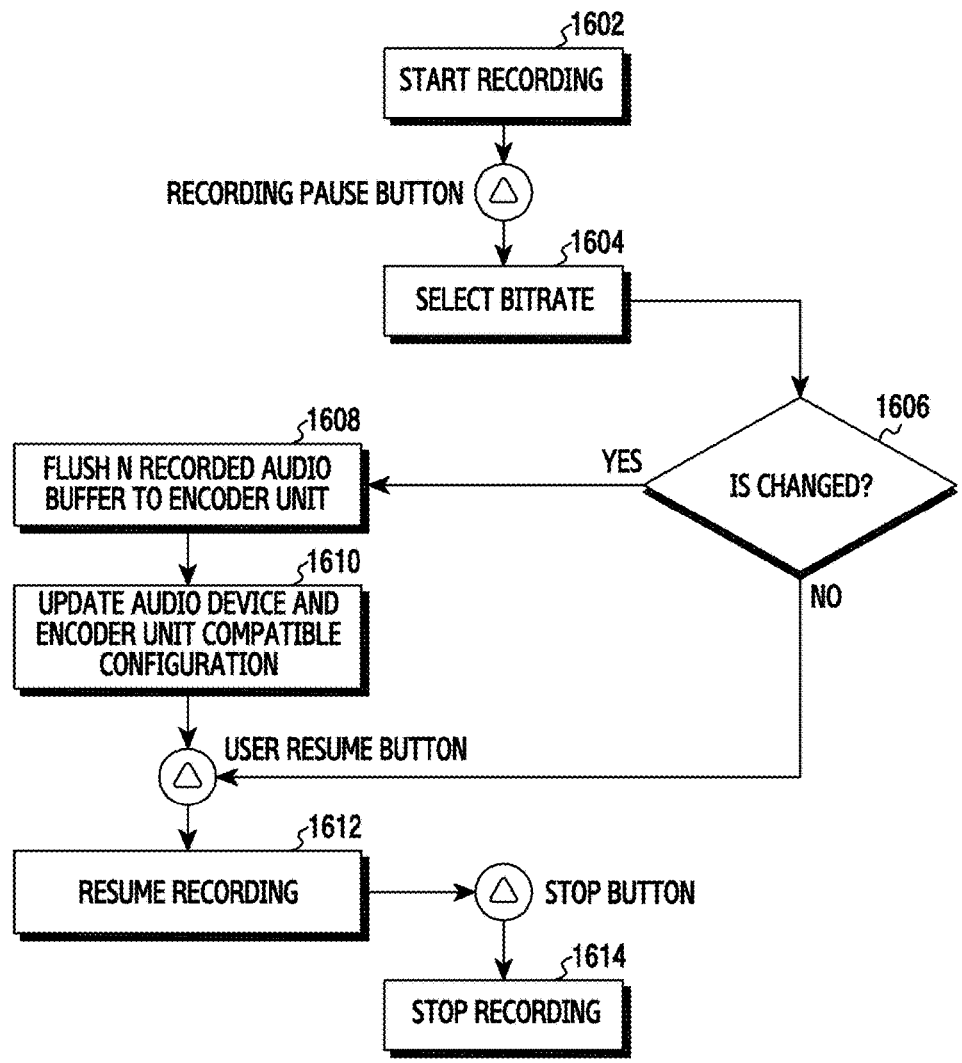
FIG. 16 is a flow diagram illustrating a method for applying audio effect to at least one audio buffer in middle of audio recording according to embodiment of the present disclosure.

FIG. 16 is a flow diagram 1600 illustrating a method for applying audio effect to change a bit rate in middle of audio recording according to embodiment of the present disclosure.

Referring to the FIG. 16, in step 1602, the electronic device 100 starts recording the audio buffers. For example, in the electronic device 100, as illustrated in the FIG. 1, the recording unit 110 starts recording the audio buffers. During the audio (i.e., media) recording the event detection unit 170 may detect the pause event. The event detection unit 170 can be configured to detect the event automatically (system generated event) or an input provided by the user.

In step 1604, the recording unit 110 is configured to detect an input to select the bitrate to be applied on the audio buffer. In step 1606, the recording unit 110 is configured to determine whether the change in the bitrate is required. If at step 1606, the recording unit 110 detects the input to change the bitrate on the audio buffer then, in step 1608, the recording unit 110 flushes "N" recorded audio buffer to the encoder unit 150. In step 1610, the recording unit 110 may update the audio unit and the encoder unit 150 compatible configuration. If at step 1606, the recording unit 110 determines that there is no change in the bitrate of the audio buffer, then in step 1612 the recording unit 110 resumes the audio recording. Once the audio recording is completed, then, in step 1614, the recording unit 110 may stop the audio recording.

Figure 17:
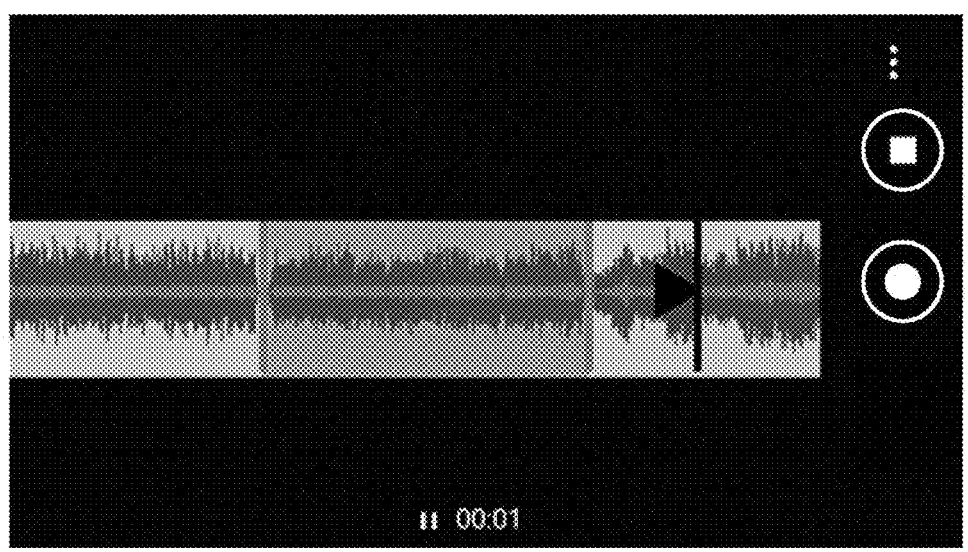
FIG. 17 illustrates an operation for skipping at least one audio buffer from a set of audio buffers during recording according to an embodiment of the present disclosure.

FIG. 17 illustrates an operation for skipping at least one audio buffer from a set of audio buffers during recording according to an embodiment of the present disclosure.

Referring to the FIG. 17, once the recording unit 110 receives the input to: pause the recording of the audio buffer and to delete/skip the audio buffer, the display unit 160 may therefore display the audio buffer list which the user can play and make multiple selections (Mark) to skip the audio buffer from the recording. Since "N" temporary buffers are in the storage medium 120, the user can select max "N" past audio buffers to skip from the recording.

Figure 18:
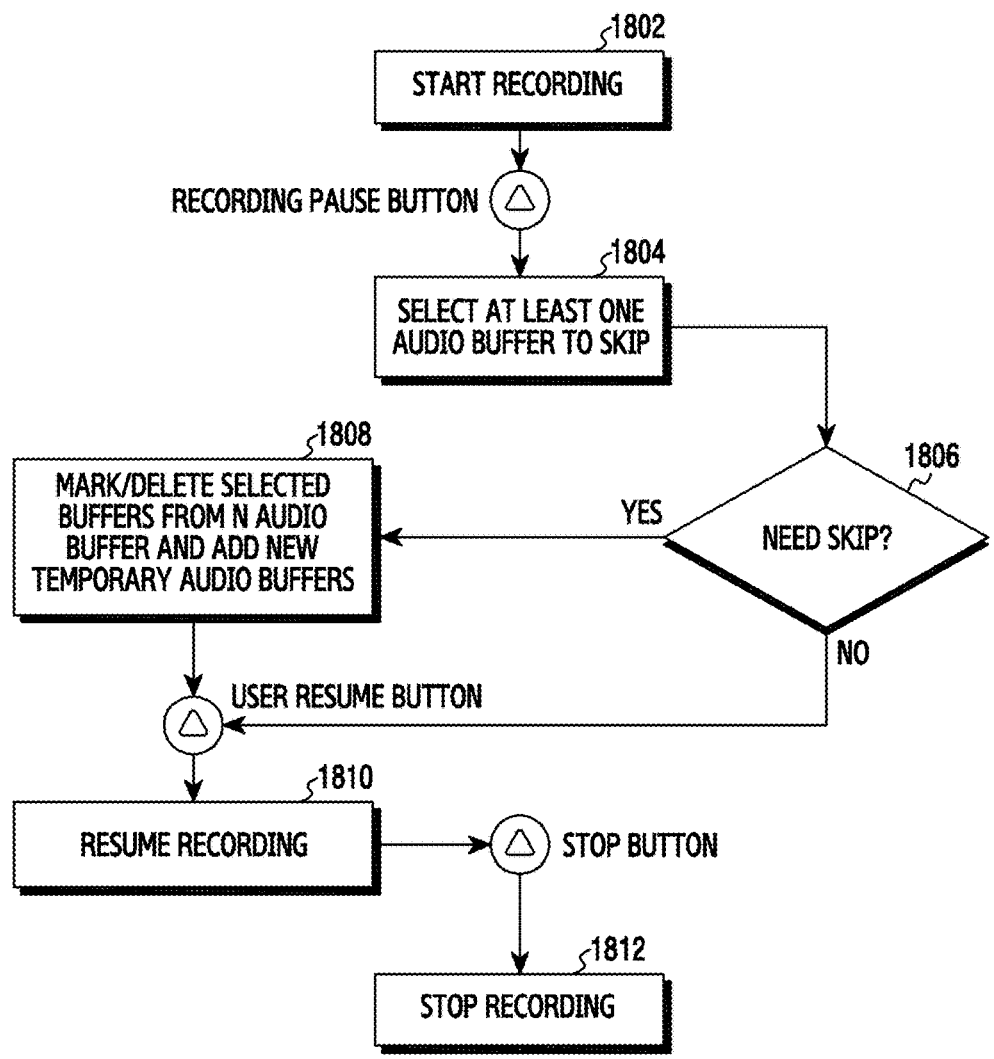
FIG. 18 is a flow diagram illustrating a method for applying an effect to skip the at least one audio buffer according to an embodiment of the present disclosure.

FIG. 18 is a flow diagram 1800 illustrating a method for applying an effect to skip at least one audio buffer according to an embodiment of the present disclosure.

Referring to the FIG. 18, in step 1802, the electronic device 100 starts recording the audio buffers. For example, in the electronic device 100, as illustrated in the FIG. 1, the recording unit 110 starts recording the audio buffers. During the audio recording the event detection unit 170 may detect the pause event. The event detection unit 170 can be configured to detect the event automatically (system generated event) or an input provided by the user.

In step 1804, the recording unit 110 is configured to detect an input performed by the user to select the audio buffer to skip. In step 1806, the recording unit 110 determines whether the audio buffer selected need to be skipped. If at step 1806, the recording unit 110 determines that the audio buffer selected is to be skipped, then in step 1808, the recording unit 110 deletes/mark the selected audio buffer from "N" audio buffer. If at step 1806, the recording unit 110 determines that the audio buffer selected shouldn't be skipped, then in step 1810, the recording unit 110 resumes the audio recording. Once the media recording is completed, then, the in step 1812, the recording unit 110 stops the audio recording.

Figure 19:
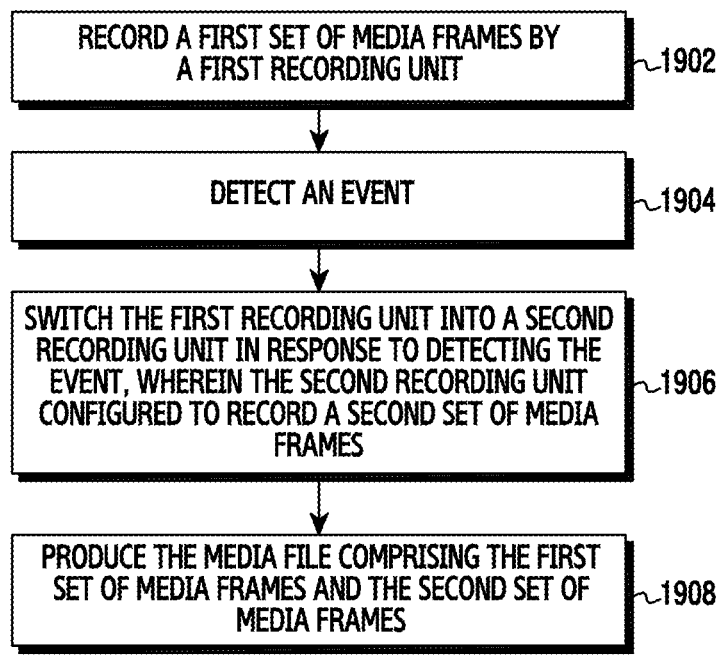
FIG. 19 is a flow diagram illustrating a method for producing a first set of media frames and a second set of media frames according to an embodiment of the present disclosure.

FIG. 19 is a flow diagram 1900 illustrating a method for producing a first set of media frames and a second set of media frames according to an embodiment of the present disclosure.

Referring to the FIG. 19, in step 1902, the electronic device 100 records the first set of media frames. For example, in the electronic device 100, as illustrated in the FIG. 1, the first recording unit 110a is configured to record the first set of media frames.

In step 1904, the electronic device 110 detects the event. For example, in the electronic device 100, as illustrated in the FIG. 1, the processor 130 is configured to detect the event.

In step 1906, the electronic device 100 switches the first recording unit 110a into the second recording unit 110b in response to detecting the event, wherein the second recording unit 110b is configured to record the second set of media frames. For example, in the electronic device 100, as illustrated in the FIG. 1, the processor 130 is configured to switch the first recording unit 110a into the second recording unit 110b in response to detecting the event, wherein the second recording unit 110b is configured to record the second set of media frames.

In step 1908, the electronic device 100 produces the media file comprising the first set of media frames and the second set of media frames. For example, in the electronic device 100, as illustrated in the FIG. 1, the processor 130 is configured to produce the media file comprising the first set of media frames and the second set of media frames.

The various actions, acts, blocks, steps, or the like in the flow chart 1900 may be performed in the order presented, in a different order or simultaneously. Further, in some embodiments, some of the actions, acts, blocks, steps, or the like may be omitted, added, modified, skipped, or the like without departing from the scope of the disclosure.

Figure 20A:
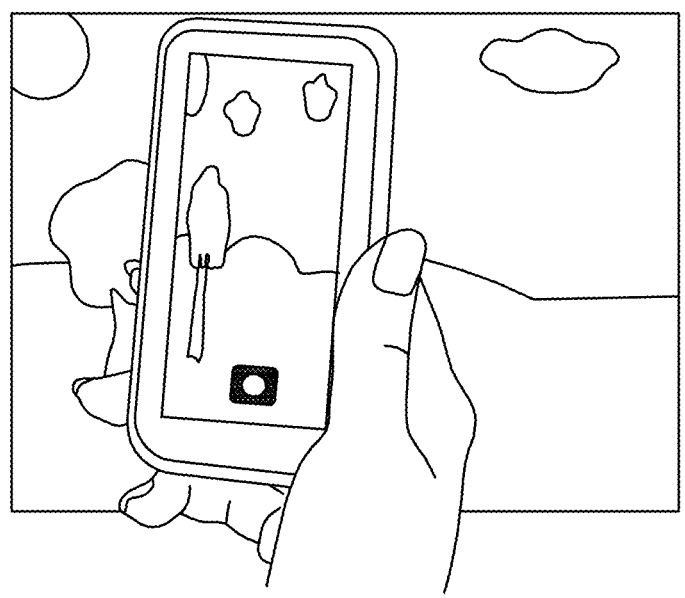
FIGS. 20A-20C illustrates an operation for switching a first recording unit into a second recording unit according to an embodiment of the present disclosure
Figure 20B:
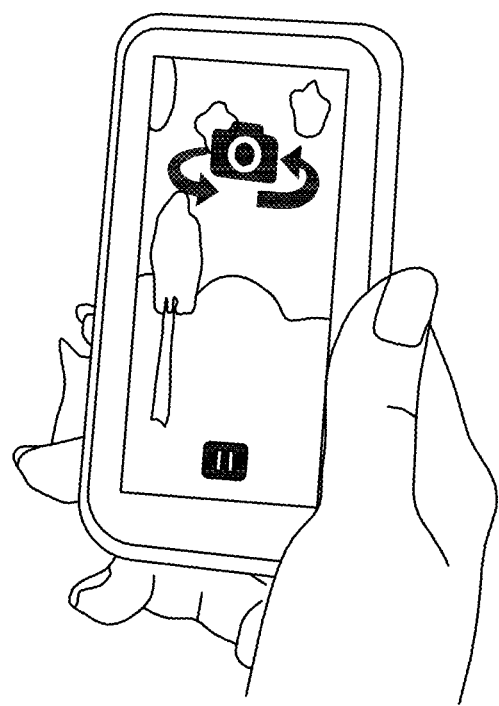
Figure 20C:
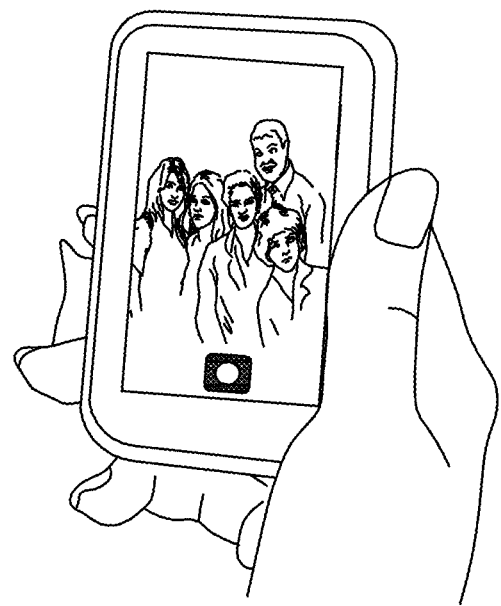

FIGS. 20A-20C illustrates an operation for switching a first recording unit 110a into a second recording unit 110b according to an embodiment of the present disclosure.

Referring to the FIGS. 20A-20C, consider the user recording the first set of media frames using first recording unit 110a. During the media recording if the processor 130 detects the event (e.g., battery low event, light event, color event, system generated events, user input, etc.), then the processor 130 can be configured to switch the first recording unit 110a into the second recording unit 110b. The second recording unit 110b continues to record the second set of media frames.

The processor 130 may produce the media file including the first set of media frames and the second set of media frame.

In the aforementioned example scenarios, while the video playing, if any of the resolution/format/codec not supported by the electronic device 100 then unsupported file error will be displayed.

Figure 21:
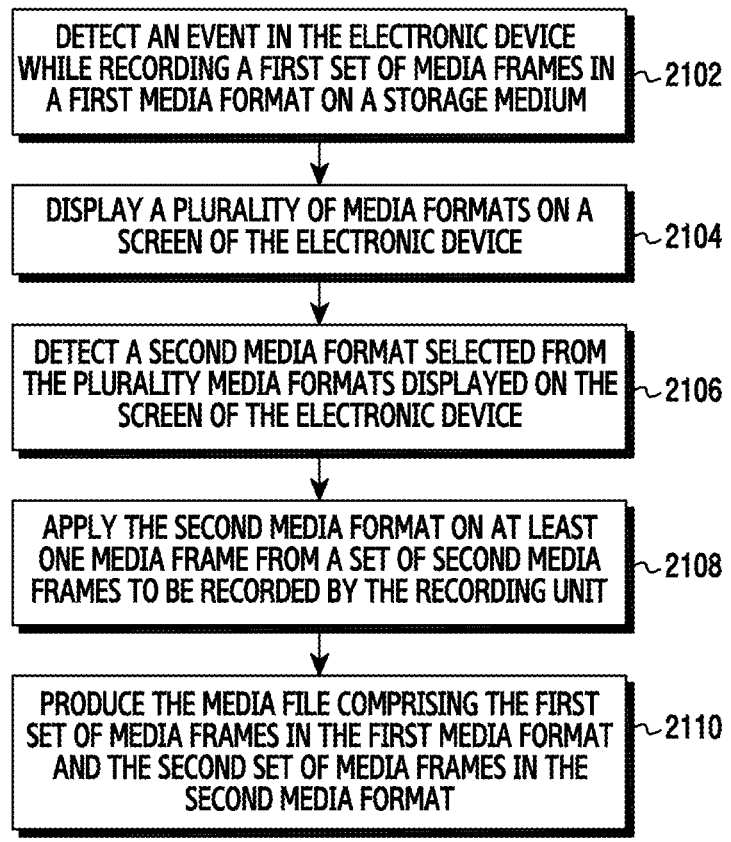
FIG. 21 is a flow diagram illustrating a method for producing a media file including a first set of media frames in first format and a second set of media frames in second format according to an embodiment of the present disclosure.

FIG. 21 is a flow diagram 2100 illustrating a method for producing a media file including a first set of media frames in first format and a second set of media frames in second format according to an embodiment of the present disclosure;

Referring to the FIG. 21, in step 2102, the electronic device 100 detects the event while recording the first set of media frames in the first media format on the temporary storage medium 120a. For example, in the electronic device 100, as illustrated in the FIG. 1, the recording unit 110 is configured to detect the event while recording the first set of media frames in the first media format on the temporary storage medium 120a.

In step 2104, the electronic device 100 displays the plurality of media formats on the screen of the display unit 160. For example, in the electronic device 100, as illustrated in the FIG. 1, the recording unit 110 is configured to display the plurality of media formats on the screen of the display unit 160.

In step 2106, the electronic device 100 detects the second media format selected from the plurality media formats on the screen of the display unit 160. For example, in the electronic device 100, as illustrated in the FIG. 1, the recording unit 110 is configured to detect the second media format selected from the plurality media formats on the screen of the display unit 160.

In step 2108, the electronic device 100 applies the second media format on the at least one media frame from the set of second media frames to be recorded by the recording unit 110. For example, in the electronic device 100, as illustrated in the FIG. 1, the recording unit 110 is configured to apply the second media format on the at least one media frame from the set of second media frames to be recorded by the recording unit 110.

In step 2110, the electronic device 100 produces the media file comprising the first set of media frames in the first media format and the second set of media frames in the second media format. For example, in the electronic device 100, as illustrated in the FIG. 1, the recording unit 110 is configured to produce the media file comprising the first set of media frames in the first media format and the second set of media frames in the second media format.

The various actions, acts, blocks, steps, or the like in the flow chart 2100 may be performed in the order presented, in a different order or simultaneously. Further, in some embodiments, some of the actions, acts, blocks, steps, or the like may be omitted, added, modified, skipped, or the like without departing from the scope of the invention.

Figure 22:
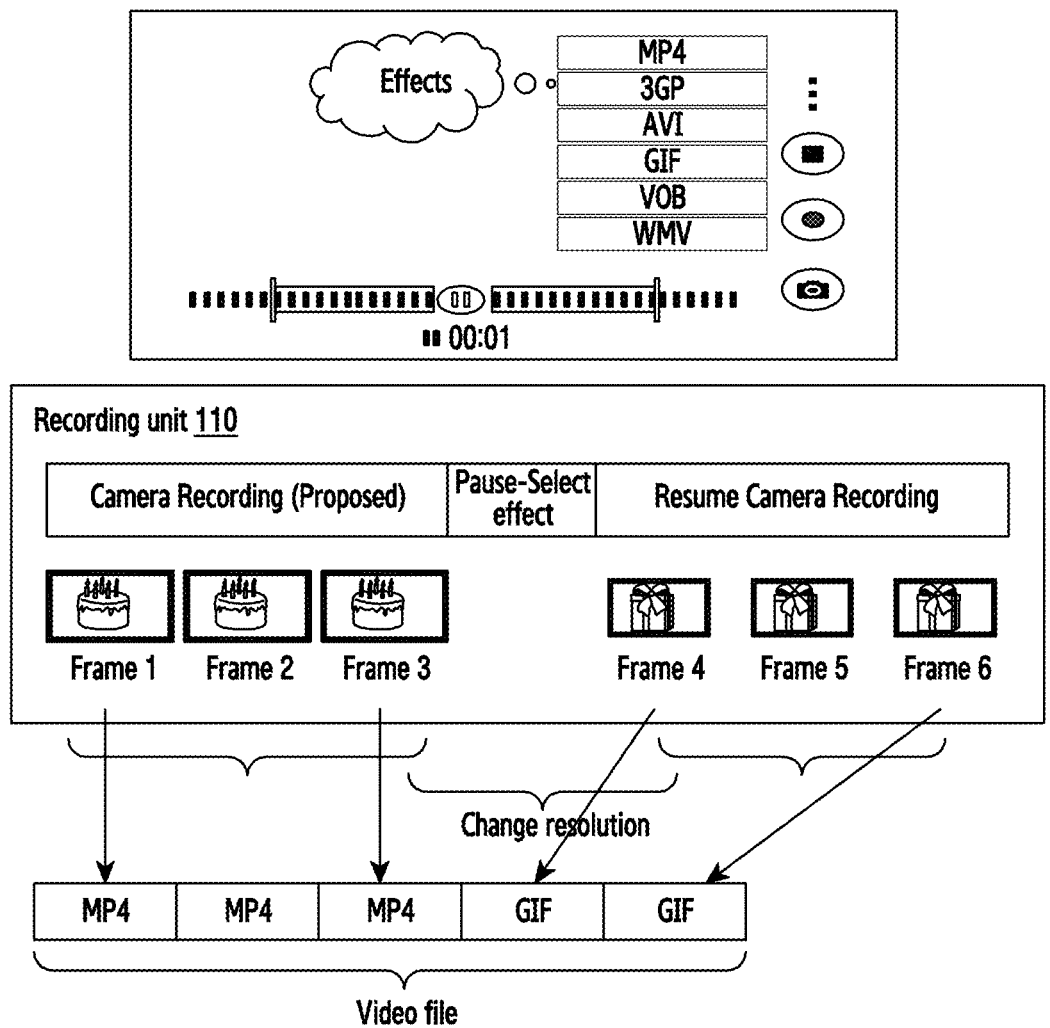
FIG. 22 illustrates an operation for changing a format of at least one media frame in middle of recording according to an embodiment of the present disclosure.

Format of the Media Frame:

Change the format of video in middle of recording while video recording is paused: FIG. 22 illustrates an operation for changing a format of at least one media frame in middle of recording according to an embodiment of the present disclosure.

Referring to FIG. 22, in order to change the quality of video in middle of pause and resume recording format of video can be changed before resuming the recording assuming that encoder unit 150 is using such a media file format which supports multi video formats. Since "N" graphics buffers of fix resolution e.g. 800×1280 are in the temporary storage medium 120, these "N" graphic buffers may be flushed to the encoder unit 150 to store on the permanent storage 120b. The configuration of the encoder unit 150 will be updated according to new format and user can resume recording with new format.

Figure 23:
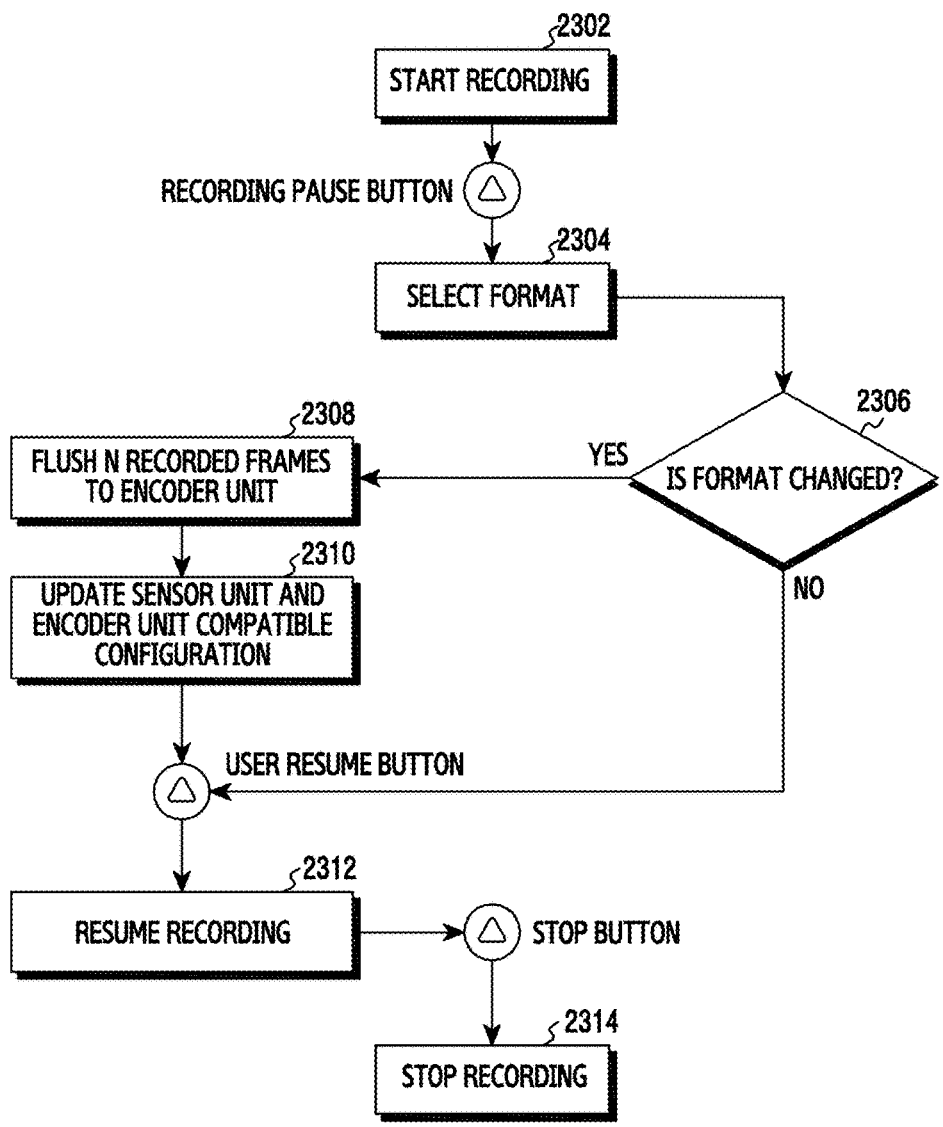
FIG. 23 is a flow diagram illustrating a method for producing a single media file including multiple media frames with different media formats according to an embodiment of the present disclosure.

FIG. 23 is a flow diagram 900 illustrating a method for producing a single media file including multiple media frames with different media formats according to an embodiment of the present disclosure.

Referring to the FIG. 23, in step 2302, the electronic device 100 starts recording the media frames. For example, in the electronic device 100, as illustrated in the FIG. 1, the sensor unit 112 of the recording unit 110 starts recording the media frames. During the media recording the event detection unit 170 may detect the pause event. The event detection unit 170 can be configured to detect the event automatically (system generated event) or an input provided by the user.

In step 2304, the recording unit 110 is configured to detect an input performed by the user to select the media format, from the plurality of media formats displayed on the screen of the electronic device 100. In step 2306, the recording unit 110 determines whether the media format of the selected media frame is changed/applied. If at step 2306, the recording unit 110 determines that the media format of the media frame is changed/applied, then at step 2308, the recording unit 110 may flush "N" recorded media frames to the encoder unit 110. In step 2310, the recording unit 110 may update the sensor unit 112 and the encoder unit 150 compatible configuration. At step 2306, if the recording unit 110 determines that the media format for the selected media frame has not changed, then in step 2312, the recording unit 110 resumes the media recording. Once the media recording is completed, then, the in step 2314, the recording unit 110 stops the media recording.

Figure 24:
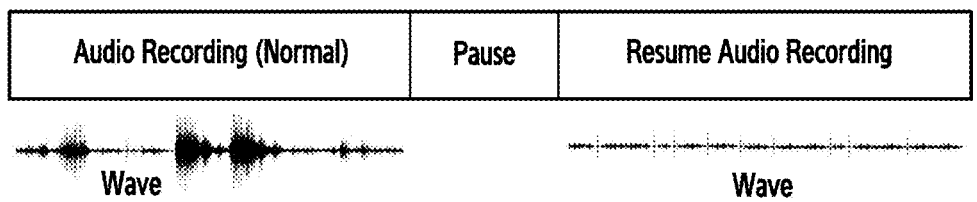
FIG. 24 illustrates an operation for changing a format at least one audio buffer from a set of audio buffers during recording according to an embodiment of the present disclosure.
Figure 24:
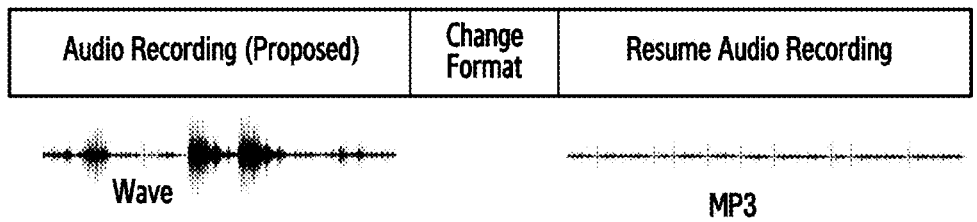

Change the format of audio in middle of recording while audio recording is paused FIG. 24 illustrates an operation for changing a format at least one audio buffer from a set of audio buffers during recording according to an embodiment of the present disclosure.

Referring to the FIG. 24, the recording unit 110 can be configured to change the quality of the audio in middle of pause event and resume recording event. The format of the audio can be changed before resuming the recording assuming that the encoder unit 150 is using such a file format which supports multi audio formats. Since N audio buffers of fix size are in the temporary storage medium 120a, these "N" audio buffers may be flushed to the encoder unit 150 and then stored on the permanent storage medium 120b. The configuration of the encoder unit 150 may be updated according to new format and user can resume recording with new format.

Figure 25:
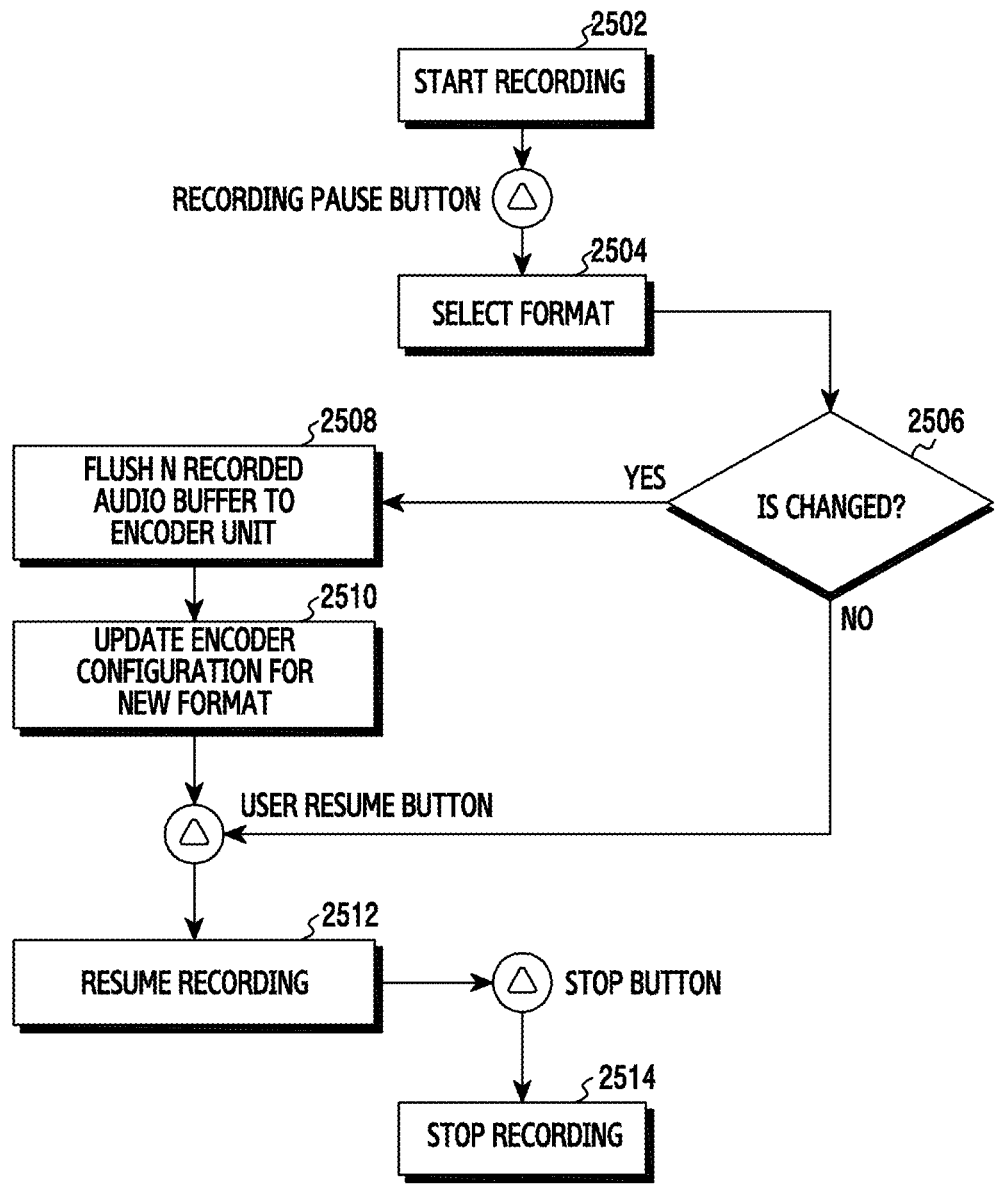
FIG. 25 is a flow diagram illustrating a method for changing a format of at least one audio buffer according to an embodiment of the present disclosure.

FIG. 25 is a flow diagram 2500 illustrating a method for changing a format of at least one audio buffer, according to an embodiment of the present disclosure.

Referring to the FIG. 25, in step 2502, the electronic device 100 starts recording the audio buffers. For example, in the electronic device 100, as illustrated in the FIG. 1, the recording unit 110 starts recording the audio buffers. During the audio (i.e., media) recording the event detection unit 170 may detect the pause event. The event detection unit 170 can be configured to detect the event automatically (system generated event) or an input provided by the user.

In step 2504, the recording unit 110 is configured to detect an input to select format to be applied on the audio buffer. In step 2506, the recording unit 110 is configured to determine whether the change in the format on the audio buffer is required. If at step 2506, the recording unit 110 detects the change in the format on the audio buffer is required then, in step 2508, the recording unit 110 flushes "N" recorded audio buffer to the encoder unit 150. In step 2510, the recording unit 110 may update the audio unit and the encoder unit 150 compatible configuration for new format. If at step 2506, the recording unit 110 determines that there is no change in the format of the audio buffer, then in step 2512 the recording unit 110 resumes the audio recording. Once the audio recording is completed, then, in step 2514, the recording unit 110 stops the audio recording.

Figure 10:
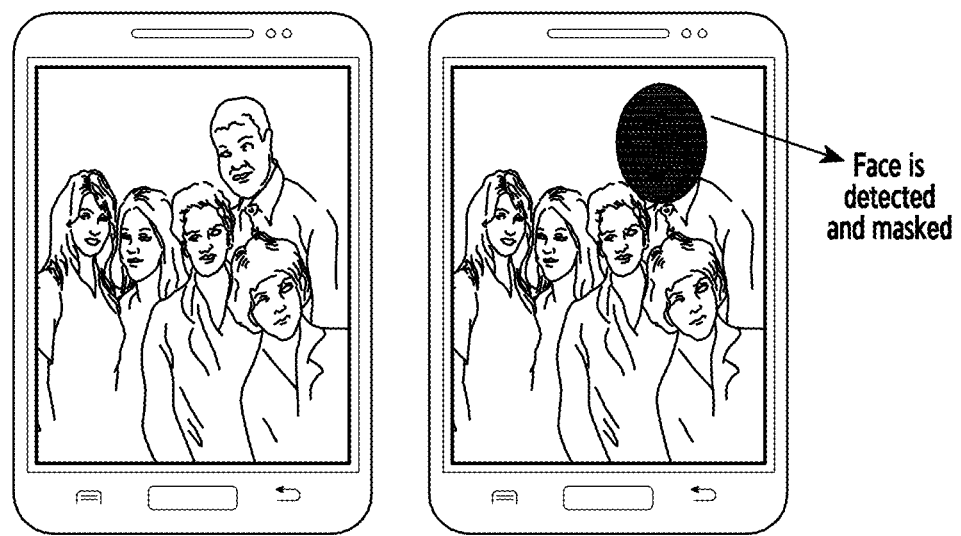
FIG. 10 illustrates an operation for detecting a preset face and applying a hide/mask effect to the preset face according to an embodiment of the present disclosure.

Applying System Generated Events:

In yet another embodiment, consider the media recording is continuing and in middle of recording the recording unit 110 identifies the preset face (through face detection unit (not shown)) and can trigger event to the electronic device 100 to secure/skip/to apply animation effects to the detected face as shown in FIG. 10. In other scenario like conference/CCTV recording if no face is detected (empty conference room) then for low quality media frames the resolution/format can be changed. As soon as the face is detected (person in conference room) then high quality media frames can be generated.

In yet another embodiment, consider the media recording is continuing and in middle of recording the recording unit 110 identifies that the scene contains high color details then the recording unit 110 can trigger color detection event and resolution/format/animation can be changed for higher quality media frames.

In yet another embodiment, the recording unit 110 can also trigger timer events based on user selection if user selects to change resolution/format high-low in every 5 min. Or the electronic device 100 script can trigger timer event to change resolution/format from high-low and from low-high in every 5 min.

In yet another embodiment, the recording unit 110 can trigger a direction event when its direction changes from current direction to any one of the left/right/up/down/front/back in 3D space. Based on directional change of the recording unit 110 can choose to increase/decrease quality of the media frames.

Figure 26:
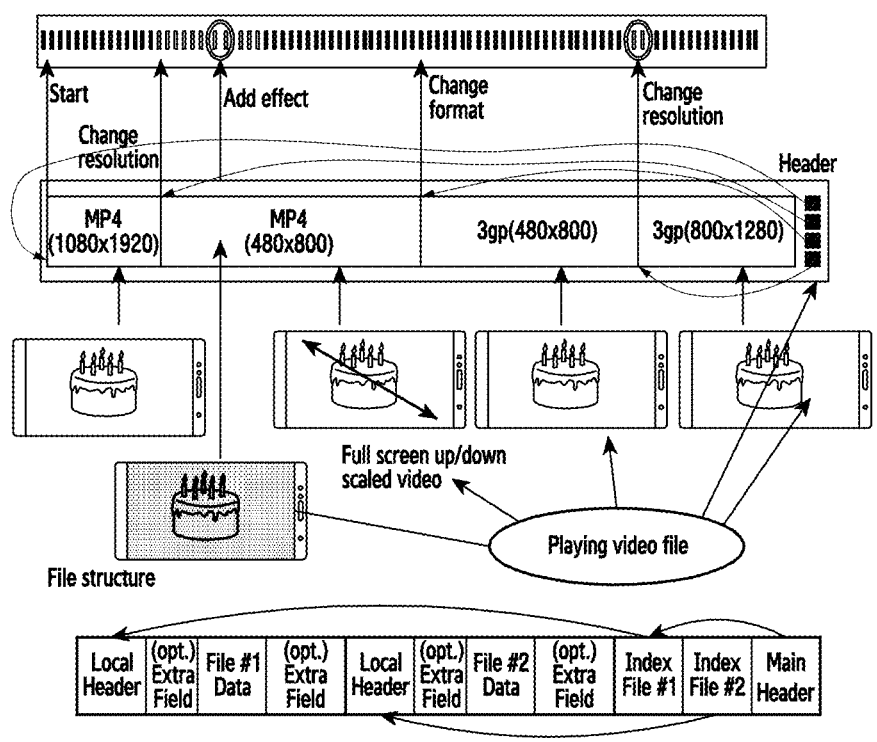
FIG. 26 illustrates an operation for applying at least one effect based on timeline according to an embodiment of the present disclosure.

FIG. 26 illustrates an operation for applying at least one effect based on timeline according to an embodiment of the present disclosure.

Referring to the FIG. 26, the user, by way of the proposed mechanism can set the preset/predefined timing (i.e., time interval), during the recording, for applying the one or more effects on the at least one media frame, For example, the recording unit 110 may receive an input i.e., after each 30 frames per second (FPS) of interval apply change in resolution of the at least one media frame, change format of the at least one media frame, change the visual parameters of the at least one media frame, etc. The recording unit 110 may automatically pause the recording and may provide an option for the user to select the desired effect to be applied on the at least one future media frame, to delete the effect already applied to the at least one past media frame, etc. The recording unit 110 may automatically continue to apply the desired effects at the desired time interval preset by the user. Thus the encoder 150 may always lag behind the sensors 112 (i.e., camera) by N buffers which are in temporary storage medium 120a until end of the media recording.

Similar mechanism can be applied while recording the audio buffers. The one or more effects such as skip the audio buffer, change the format of the audio buffer, etc., can be applied after a predefined timing set by the user.

Figure 27:
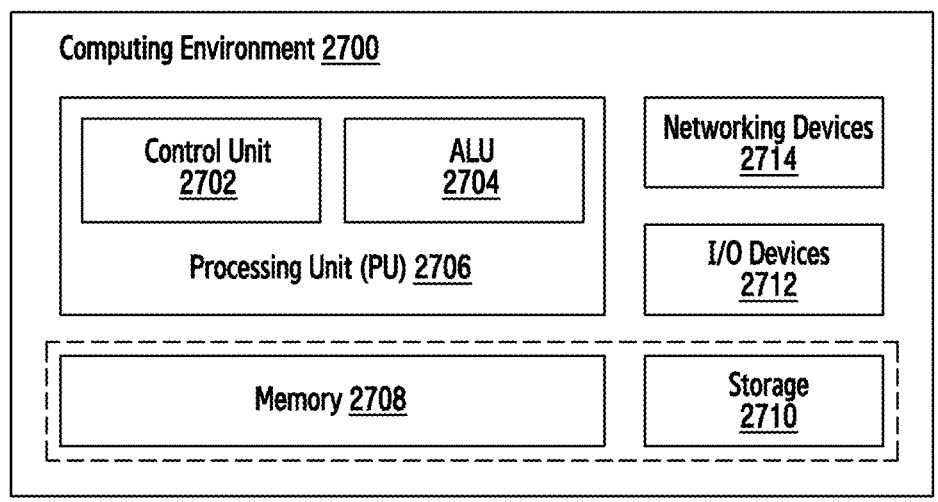
FIG. 27 illustrates an architecture for implementing a method for producing a media file according to embodiments of the present disclosure.

FIG. 27 illustrates an architecture for implementing a method for producing a media file according to embodiments of the present disclosure. As depicted in the FIG. 27, the computing environment 2700 comprises at least one processing unit 2706 that is equipped with a control unit 2702 and an Arithmetic Logic Unit (ALU) 2704, a memory 2708, a storage unit 2710, plurality of networking devices 2714 and a plurality Input output (I/O) devices 2712. The processing unit 2706 is responsible for processing the instructions of the technique. The processing unit 2706 receives commands from the control unit 2702 in order to perform its processing. Further, any logical and arithmetic operations involved in the execution of the instructions are computed with the help of the ALU 2704.

The overall computing environment 2700 can be composed of multiple homogeneous and/or heterogeneous cores, multiple CPUs of different kinds, special media and other accelerators. The processing unit 2706 is responsible for processing the instructions of the technique. Further, the plurality of processing units 2706 may be located on a single chip or over multiple chips.

The technique comprising of instructions and codes required for the implementation are stored in either the memory unit 2708 or the storage 2710 or both. At the time of execution, the instructions may be fetched from the corresponding memory 2708 or storage 2710, and executed by the processing unit 2708.

In case of any hardware implementations various networking devices 2714 or external I/O devices 2712 may be connected to the computing environment to support the implementation through the networking unit and the I/O device unit.

The embodiments of the present disclosure can be implemented through at least one software program running on at least one hardware device and performing network management functions to control the elements. The elements shown in the FIGS. 1 through 27 include blocks which can be at least one of a hardware device, or a combination of hardware device and software module.

Certain aspects of the present disclosure can also be embodied as computer readable code on a non-transitory computer readable recording medium. A non-transitory computer readable recording medium is any data storage device that can store data which can be thereafter read by a computer system. Examples of the non-transitory computer readable recording medium include a read-only memory (ROM), a random-access memory (RAM), compact disc-ROMs (CD-ROMs), magnetic tapes, floppy disks, and optical data storage devices. The non-transitory computer readable recording medium can also be distributed over network coupled computer systems so that the computer readable code is stored and executed in a distributed fashion. In addition, functional programs, code, and code segments for accomplishing the present disclosure can be easily construed by programmers skilled in the art to which the present disclosure pertains.

At this point it should be noted that the various embodiments of the present disclosure as described above typically involve the processing of input data and the generation of output data to some extent. This input data processing and output data generation may be implemented in hardware or software in combination with hardware. For example, specific electronic components may be employed in a mobile device or similar or related circuitry for implementing the functions associated with the various embodiments of the present disclosure as described above. Alternatively, one or more processors operating in accordance with stored instructions may implement the functions associated with the various embodiments of the present disclosure as described above. If such is the case, it is within the scope of the present disclosure that such instructions may be stored on one or more non-transitory processor readable mediums. Examples of the processor readable mediums include a ROM, a RAM, CD-ROMs, magnetic tapes, floppy disks, and optical data storage devices. The processor readable mediums can also be distributed over network coupled computer systems so that the instructions are stored and executed in a distributed fashion. In addition, functional computer programs, instructions, and instruction segments for accomplishing the present disclosure can be easily construed by programmers skilled in the art to which the present disclosure pertains.

While the present disclosure has been shown and described with reference to various embodiments thereof, it will be understood by those skilled in the art that various changes in form and details may be made therein without departing form the spirit and scope of the present disclosure as defined by the appended claims and their equivalents.

What is claimed is:

1. A method for producing a media file in an electronic device, the method comprises:
   detecting an event during recording of media frames;
   determining at least one effect to be applied on the media frames;
   applying the determined effect on at least one of at least one first media frame from a first set of the media frames and at least one second media frame from a second set of the media frames; and
   generating a media file comprising the first and second sets of the media frames.

2. The method of claim 1, wherein the applying comprises:
   presenting at least one of at least part of the first set of the media frames and the second set of the media frames;
   determining at least one of the at least one first media frame and the at least one second media frame selected from the presented part of the first set of the media frames and the second set of the media frames to be applied with the determined effect thereon; and
   changing the selected at least one of the at least one first media frame and the at least one second media frame by applying the determined effect thereon.

3. The method of claim 1, wherein the second set of the media frames is subsequent to the first set of the media frames.

4. The method of claim 3, wherein the first set of the media frames is previously recorded and the second set of the media frame is to be recorded subsequent to the first set of the media frame after the event.

5. The method of claim 1, wherein the first set of the media frames and the second set of the media frames are stored in at least one temporary buffer, wherein the selected effect is applied on the at least one of the at least one first media frame and the at least one second media frame in the at least one temporary buffer before being stored in a permanent storage medium.

6. The method of claim 1, wherein the event is at least one of a battery event, a pause event, a memory space event, a light event, and a system generated event.

7. The method of claim 1, wherein the effect is at least one of an animation effect, an effect to change visual parameters of at least one media frame, an effect to skip at least one media frame, an effect to secure at least one media frame, an effect to mask at least one region of interest (ROI) in at least one media frame, an effect to change a media format of at least one media frame, and an effect to switch among recording units of the electronic device.

8. The method of claim 1, wherein the applying comprises:
determining the at least one first media frame from the first set of the media frames to be applied with the determined effect thereon, wherein the selected effect is an effect to skip the at least one first media frame;
skipping the at least one first media frame; and
recording the second set of the media frames subsequent to the first set of the media frames remained by skipping the at least one first media frame.

9. The method of claim 1, wherein the applying comprises:
determining the at least one first media frame selected from the first set of the media frames to be applied with the determined effect thereon;
changing the selected at least one first media frame by applying the determined effect thereon; and
changing the at least one second media frame from the second set of the media frames by applying the determined effect thereon.

10. The method of claim 1, wherein the applying comprises:
determining the at least one second media frame from the second set of the media frames selected to be applied with the determined effect thereon;
changing the at least one first media frame from the second set of the media frames by applying the determined effect thereon; and
changing the selected at least one second media frame by applying the determined effect thereon.

11. An electronic device for producing a media file, the electronic device comprises:
at least one processor configured to:
detect an event during recording of media frames;
determine at least one effect to be applied on the media frames;
apply the determined effect on at least one of at least one first media frame from a first set of media frames and at least one second media frame from a second set of media frames; and
generate a media file comprising the first and second sets of the media frames.

12. The device of claim 11, wherein the at least one processor is further configured to:
present at least one of at least part of the first set of the media frames and the second set of the media frames;
determine at least one of the at least one first media frame and the at least one second media frame selected from the presented part of the first set of the media frames and the second set of the media frames to be applied with the determined effect thereon; and
change the selected at least one of the at least one first media frame and the at least one second media frame by applying the determined effect thereon.

13. The device of claim 11, wherein the second set of the media frames is subsequent to the first set of the media frames.

14. The device of claim 13, wherein the first set of the media frames is previously recorded and the second set of the media frame is to be recorded subsequent to the first set of the media frame after the event.

15. The method of claim 11, wherein the first set of the media frames and the second set of the media frames are stored in at least one temporary buffer, wherein the selected effect is applied on the at least one of the at least one first media frame and the at least one second media frame in the at least one temporary buffer before being stored in a permanent storage medium.

16. The device of claim 11, wherein the effect is at least one of an animation effect, an effect to change visual parameters of at least one media frame, an effect to skip at least one media frame, an effect to secure at least one media frame, an effect to mask at least one region of interest (ROI) in at least one media frame, an effect to change a media format of at least one media frame, and an effect to switch among recording units of the electronic device.

17. The device of claim 11, wherein the at least one processor is further configured to:
determine the at least one first media frame from the first set of the media frames to be applied with the determined effect thereon, wherein the selected effect is an effect to skip the at least one first media frame;
skip the at least one first media frame; and
record the second set of the media frames subsequent to the first set of the media frames remained by skipping the at least one first media frame.

18. The device of claim 11, wherein the at least one processor is further configured to:
determine the at least one first media frame selected from the first set of the media frames to be applied with the determined effect thereon;
change the selected at least one first media frame by applying the determined effect thereon; and
change the at least one second media frame from the second set of the media frames by applying the determined effect thereon.

19. The device of claim 11, wherein the at least one processor is further configured to:
determine the at least one second media frame from the second set of the media frames selected to be applied with the determined effect thereon;
change the at least one first media frame from the second set of the media frames by applying the determined effect thereon; and
change the selected at least one second media frame by applying the determined effect thereon.

20. At least one non-transitory computer-readable medium comprising computer executable instructions that when executed by at least one processor of an electronic device cause the at least one processor to effectuate a method comprising the operations of:
detecting an event during recording of media frames;
determining at least one effect to be applied on the media frames;
applying the determined effect on at least one of at least one first media frame from a first set of media frames and at least one second media frame from a second set of media frames; and generating a media file comprising the first and second sets of the media frames.

* * * * *